United States Patent
Almy et al.

(10) Patent No.: US 9,755,571 B2
(45) Date of Patent: Sep. 5, 2017

(54) PHOTOVOLTAIC MOUNTING SYSTEM WITH CHEMICAL FLASHING

(71) Applicant: SolarCity Corporation, San Mateo, CA (US)

(72) Inventors: Charles Almy, Berkeley, CA (US); Tyrus Hawkes Hudson, Petaluma, CA (US); Jack Raymond West, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 14/949,820

(22) Filed: Nov. 23, 2015

(65) Prior Publication Data

US 2016/0248367 A1   Aug. 25, 2016

Related U.S. Application Data

(60) Provisional application No. 62/120,841, filed on Feb. 25, 2015.

(51) Int. Cl.
*E04D 13/18* (2014.01)
*H02S 20/23* (2014.01)
*F24J 2/52* (2006.01)

(52) U.S. Cl.
CPC ........... *H02S 20/23* (2014.12); *F24J 2/52* (2013.01); *Y02B 10/12* (2013.01)

(58) Field of Classification Search
CPC ................ H02S 20/23; H02S 30/10
(Continued)

(56) References Cited

U.S. PATENT DOCUMENTS 2,092,341 A   7/1937   De Vries
2,666,354 A   6/1950   Dim et al.
(Continued)

FOREIGN PATENT DOCUMENTS

CN   202796998 U   3/2013
EP    0276708 A1   8/1988
(Continued)

OTHER PUBLICATIONS

International Search Report mailed on Jun. 10, 2016 for International Patent Application No. PCT/US2016/019630, 7 pages.
(Continued)

*Primary Examiner* — Basil Katcheves
(74) *Attorney, Agent, or Firm* — Kilpatrick Townsend & Stockton LLP

(57) ABSTRACT

Photovoltaic mounting systems having sealant injection system are provided herein. Such sealant injection systems provide improved directional control of sealant flow and improved sealing of roof penetrations during mounting with one or more fasteners. Such systems can include a bracket assembly having a removable sealant injection package. The sealant injection package includes a collapsible sealant injection reservoir and is adapted to provide directionally controlled release of sealant upon collapse. Such a system can further include sealant injection guides that direct flow of sealant during mounting and pads or caps that cover and enclose the injected sealant so as to ensure adequate sealing of any roof penetrations and maintain its integrity over time. Such systems further allow for sealant injection packages to be interchanged or replaced as needed and allow for ready removal or replacement of the bracket after mounting while maintaining the seal of any roof penetrations.

20 Claims, 20 Drawing Sheets

(58) Field of Classification Search
USPC .............. 52/173.3, 704, 698; 411/386, 413; 405/259.1, 259.3
See application file for complete search history.

(56) References Cited

U.S. PATENT DOCUMENTS

| | | | |
|---|---|---|---|
| 3,504,498 A * | 4/1970 | Triplett | E21D 21/0093 405/259.3 |
| 3,940,941 A * | 3/1976 | Libert | F16B 35/04 405/259.6 |
| 4,119,083 A | 10/1978 | Heyen et al. | |
| 4,372,708 A * | 2/1983 | Bower, Jr. | E21D 20/025 206/219 |
| 4,407,477 A | 10/1983 | Backlund et al. | |
| 4,425,065 A | 1/1984 | Sweeney | |
| 4,472,088 A * | 9/1984 | Martin | E21D 21/0006 405/259.1 |
| 4,531,861 A * | 7/1985 | Kash | F16B 5/0275 405/259.1 |
| 4,555,206 A | 11/1985 | Sweeney | |
| 4,619,094 A | 10/1986 | Yang | |
| 4,693,652 A | 9/1987 | Sweeney | |
| 4,830,558 A | 5/1989 | Sweeney | |
| 4,896,416 A * | 1/1990 | Cranko | F16B 13/0841 248/231.9 |
| 5,281,065 A | 1/1994 | Wu | |
| 5,315,800 A * | 5/1994 | Weber | E04B 1/4157 411/82 |
| 5,513,075 A | 4/1996 | Capper | |
| 5,873,201 A | 2/1999 | Fey | |
| 5,937,603 A | 8/1999 | Zeidler | |
| 6,007,043 A | 12/1999 | Sperber | |
| 6,017,176 A | 1/2000 | Marui | |
| 6,035,595 A | 3/2000 | Anderson | |
| 6,536,729 B1 | 3/2003 | Haddock | |
| 7,963,726 B2 * | 6/2011 | Boot | E21D 21/0006 405/259.1 |
| 8,011,868 B2 | 9/2011 | Stephan | |
| 8,151,522 B2 | 4/2012 | Stearns et al. | |
| 8,557,081 B2 | 10/2013 | Sha et al. | |
| 8,615,954 B1 | 12/2013 | Graboski | |
| 8,733,718 B2 | 5/2014 | Corsi | |
| 8,756,871 B1 | 6/2014 | Johnson | |
| 8,756,881 B2 | 6/2014 | West et al. | |
| 8,875,453 B2 * | 11/2014 | Kanczuzewski | F16M 13/02 136/244 |
| 8,920,088 B1 | 12/2014 | Garvin | |
| 8,931,989 B2 | 1/2015 | Stephan | |
| 2007/0272234 A1 * | 11/2007 | Allen | F24J 2/16 126/704 |
| 2011/0067693 A1 | 3/2011 | Paull | |
| 2011/0126888 A1 | 6/2011 | Naitoh et al. | |
| 2012/0144760 A1 | 6/2012 | Schaefer et al. | |
| 2012/0186630 A1 * | 7/2012 | Jenkins | E04D 13/158 136/251 |
| 2012/0279560 A1 | 11/2012 | Sumida et al. | |
| 2013/0020455 A1 | 1/2013 | Sizelove et al. | |
| 2013/0133270 A1 * | 5/2013 | West | E04B 1/38 52/58 |
| 2013/0167455 A1 | 7/2013 | Jenkins et al. | |
| 2013/0291479 A1 * | 11/2013 | Schaefer | F24J 2/5245 52/745.21 |
| 2013/0299655 A1 | 11/2013 | Sader | |
| 2014/0000584 A1 | 1/2014 | Raucher et al. | |
| 2014/0060625 A1 | 3/2014 | Beuke et al. | |
| 2014/0130847 A1 * | 5/2014 | West | F24J 2/5211 136/251 |
| 2014/0130957 A1 | 5/2014 | Verdier et al. | |
| 2014/0175244 A1 | 6/2014 | West et al. | |
| 2014/0196769 A1 * | 7/2014 | Schoop | H01L 31/048 136/251 |
| 2015/0107185 A1 | 4/2015 | Kose et al. | |
| 2015/0204062 A1 | 7/2015 | Traxler | |
| 2015/0218824 A1 * | 8/2015 | Schaefer | E04C 3/06 52/704 |
| 2015/0280639 A1 * | 10/2015 | Atchley | H02S 20/23 248/237 |
| 2016/0142006 A1 * | 5/2016 | Meine | H02S 20/23 174/535 |

FOREIGN PATENT DOCUMENTS

| | | |
|---|---|---|
| EP | 2348263 A3 | 12/2014 |
| GB | 442832 A | 2/1936 |
| GB | 2 454 368 A | 5/2009 |
| JP | 2008274591 A | 11/2008 |
| JP | 2014 088733 A | 5/2014 |
| JP | 5555364 B1 | 7/2014 |
| WO | 2008/156578 A1 | 12/2008 |

OTHER PUBLICATIONS

Written Opinion mailed on Jun. 10, 2016 for International Patent Application No. PCT/US2016/019630, 6 pages.
"S-5! The Right Way" CorruBracket Brochure, Metal Roof Innovations, Ltd., Colorado Springs, CO, 2010, 2 pages, retrieved from the internet on Jan. 26, 2016 from http://www.sunsourceproducts.com/catalog/productdetail.asp?cat=07&part=S5-COR.

* cited by examiner

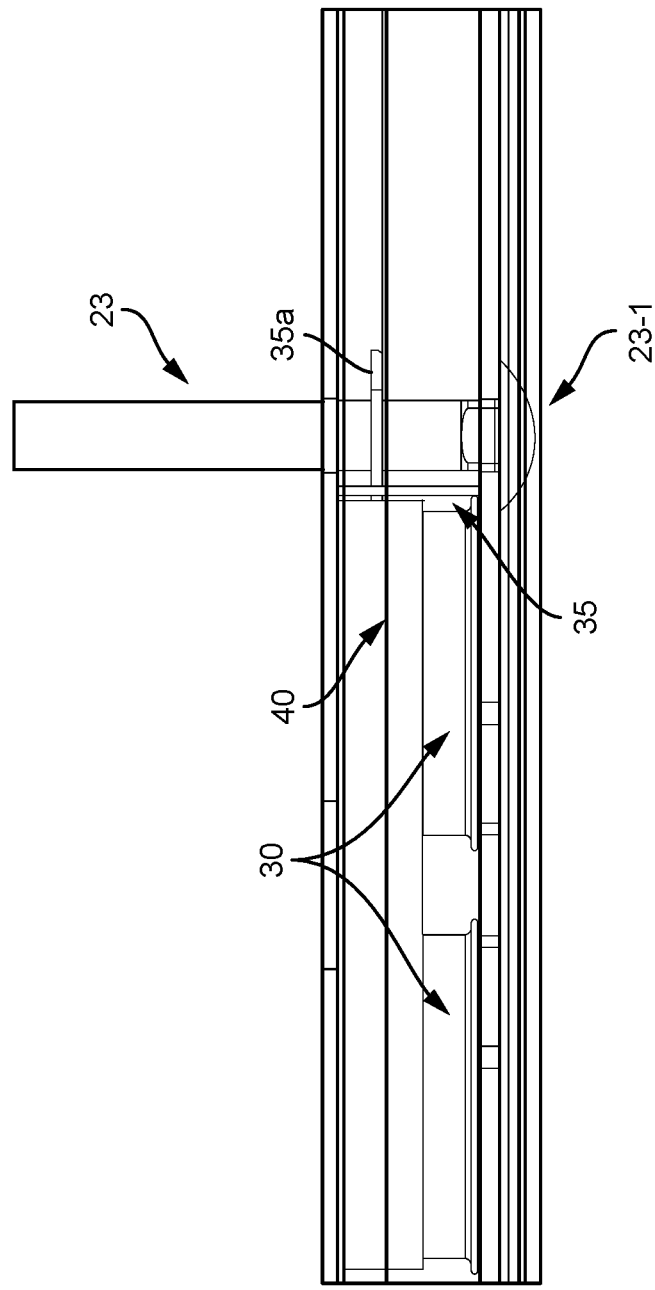

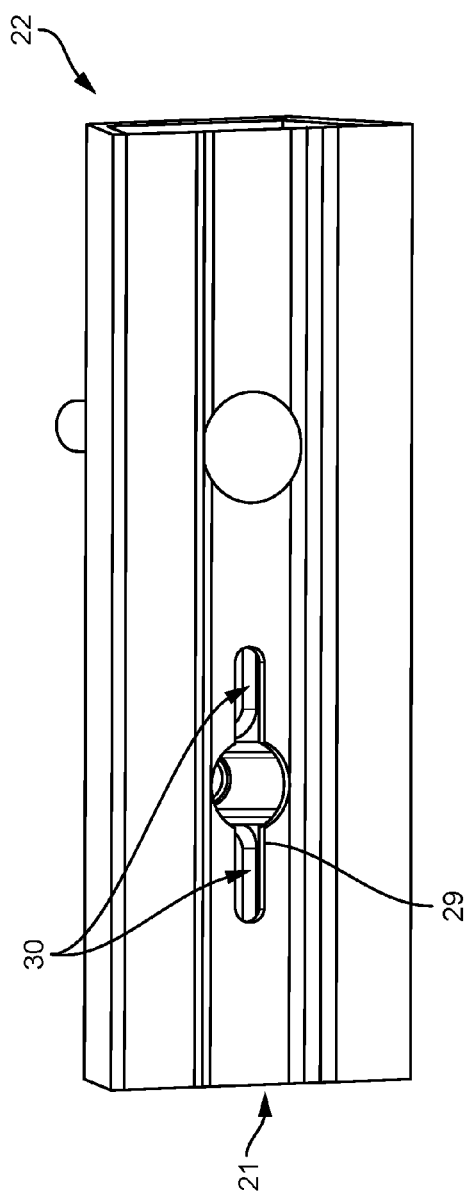
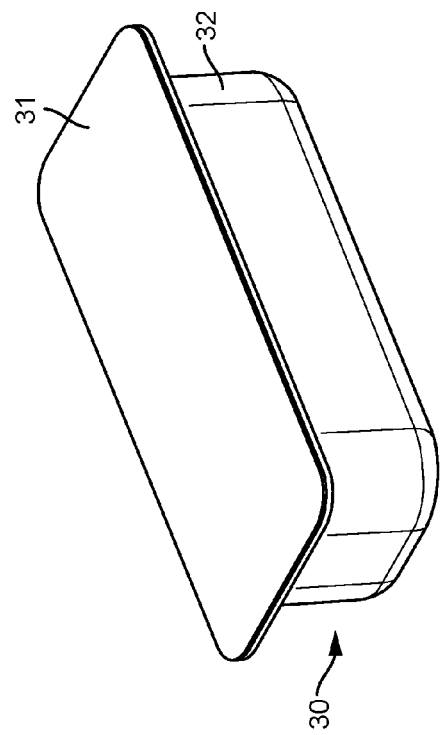

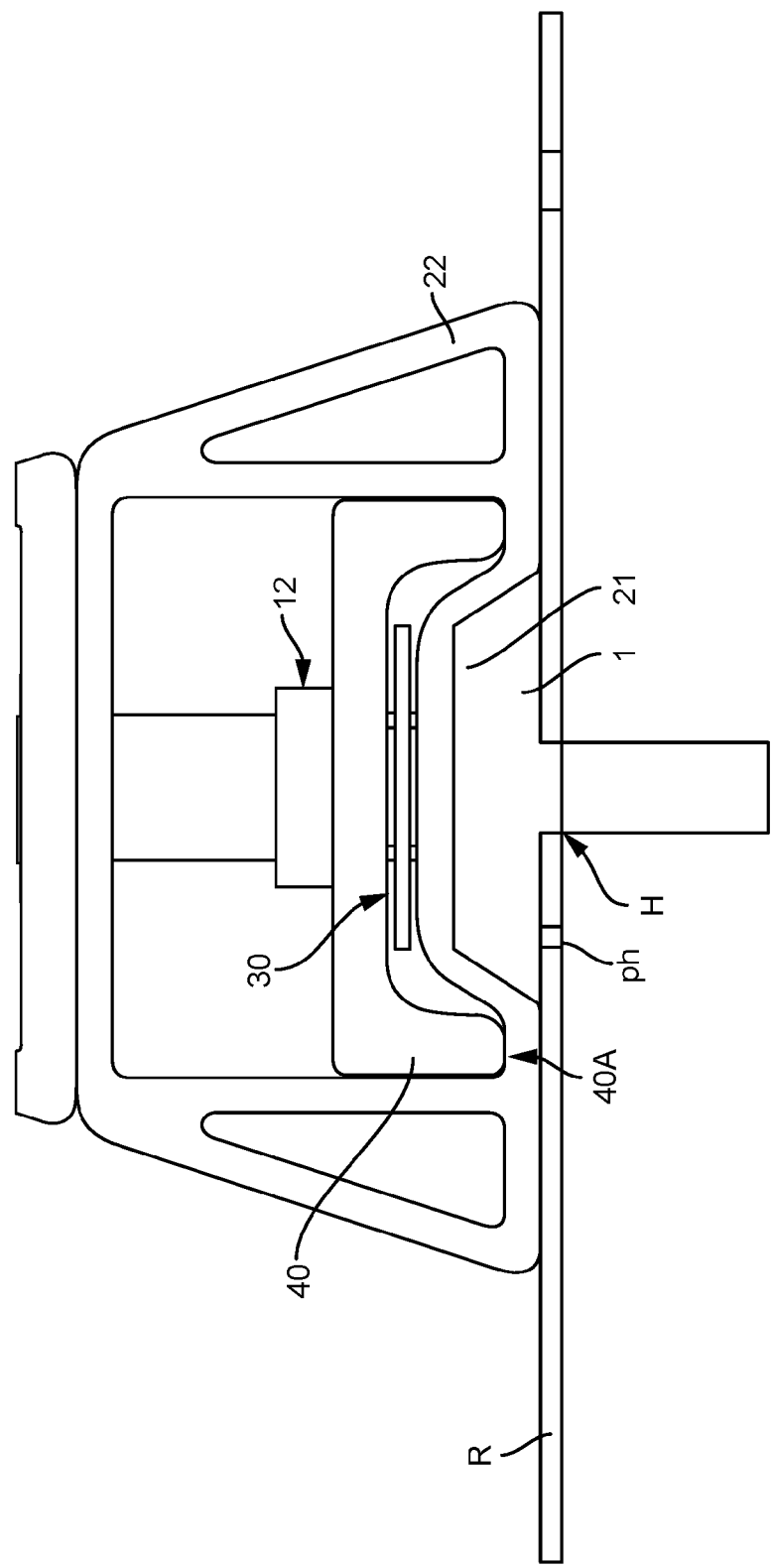

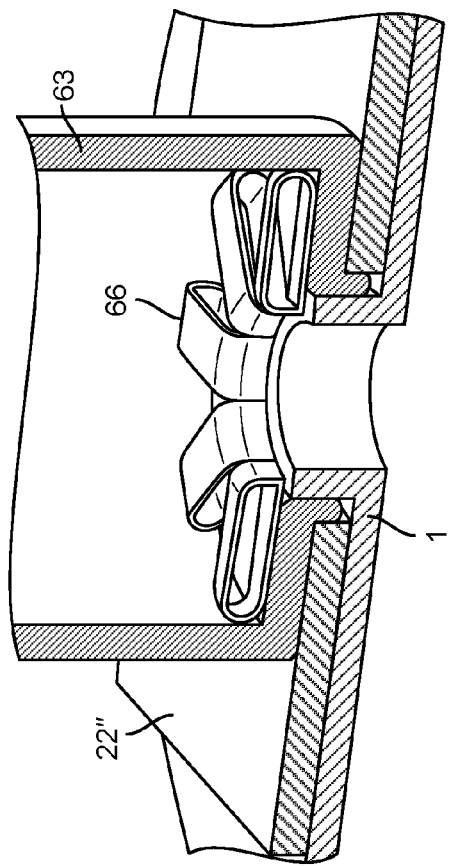
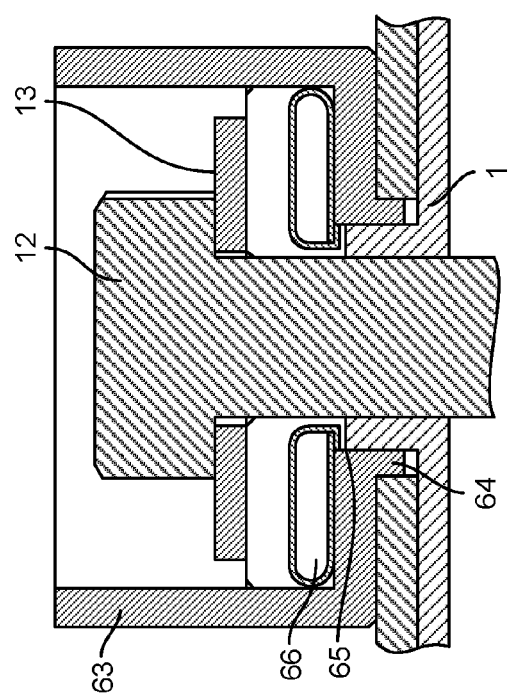
FIG. 14A
FIG. 14B

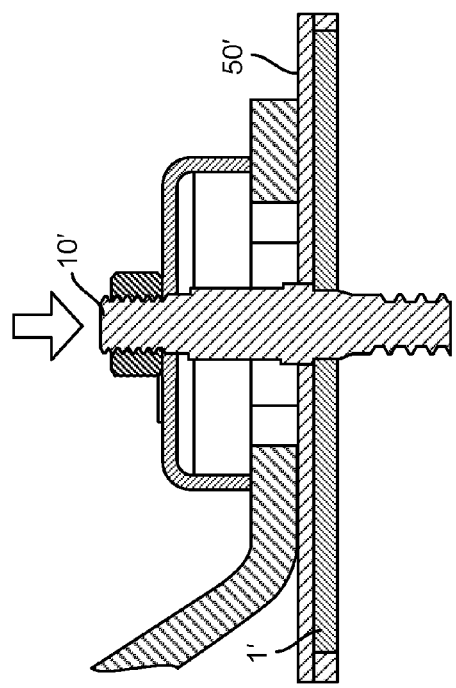
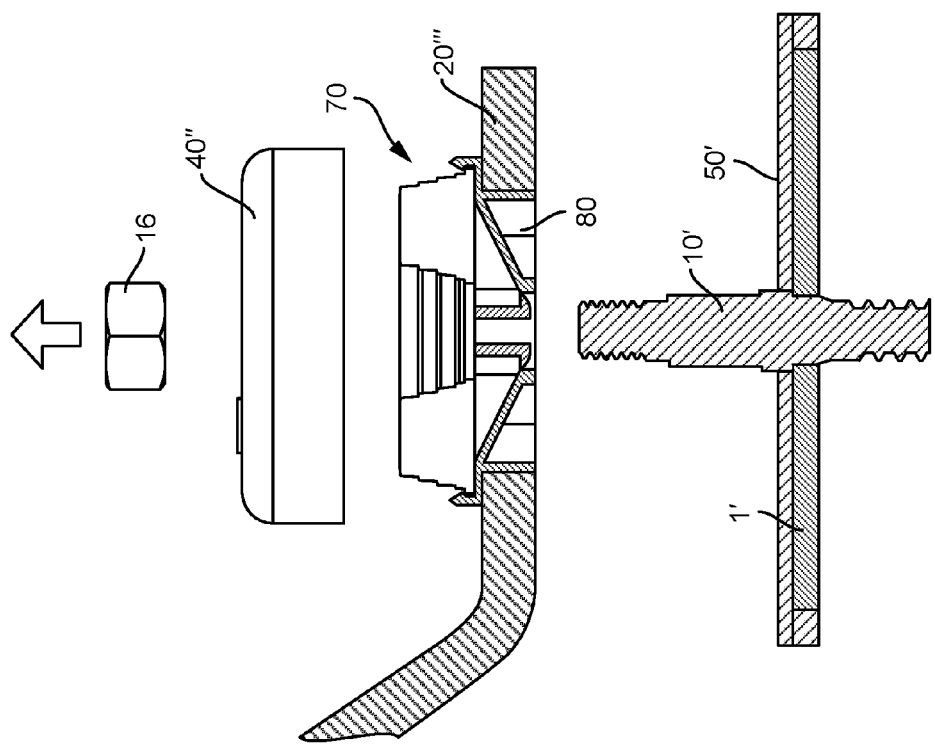

PHOTOVOLTAIC MOUNTING SYSTEM WITH CHEMICAL FLASHING

CROSS REFERENCE TO RELATED APPLICATIONS

This claims the benefit of priority of U.S. Provisional Patent Application No. 62/120,841 filed on Feb. 25, 2015, the entire contents of which are incorporated herein by reference.

FIELD OF THE INVENTION

The invention relates to photovoltaic energy generation mounting systems and more specifically to systems and methods for installing photovoltaic modules on composition shingle roofs.

BACKGROUND

Although total market penetration of solar into the relevant base of potential customers remains relatively low in the United States (e.g. less than about one percent), residential and commercial solar installs have enjoyed double digit growth since the mid to late 2000s. Despite this recent success, developments to reduce cost, increase efficiency and improve overall home integration are ongoing and must continue to increase solar's relatively meager market share when compared to fossil fuel-based grid power.

One problem that remains to be solved is an economic and effective solution to improve sealing of roof surface penetrations to prevent water from leaking into the roof structure. Whether photovoltaic modules are attached to rails, or proprietary rail-free mounting systems, the modules must be securely attached to the roof, which typically involves using a flashing combined with a lag bolt and seal. A pilot hole is typically drilled where the rafter is thought to lie, and if so, is followed by a larger drill hole to accommodate the lag bolt. The flashing is then positioned so that the lag throughhole and seal are positioned over the pre-drilled hole. Typically a puck or other structure is then placed on the flashing a lag bolt is then passed through the puck, through the through-hole in flashing and into the pre-drilled hole. The lag bolt is then torqued down to secure the puck to the roof so that the photovoltaic modules can then be mounted to the puck and flashing.

Although flashings cover up a lot of space, potentially covering mis-drilled or off-center pilot holes, flashings are relatively expensive because they require more metal than direct mounted solutions. Also, in order to set the flashing at the proper location, partially under the up-roof course of shingles, it is often necessary to remove existing nails holding down those shingles. Each time a nail is removed, another potential leak point is created.

Some installers have utilized direct mount or deck mounted solutions which abandon the flashing in favor of a flat bottomed mounting bracket or foot that is screwed or lagged directly into the roof. In cases where the lag is driven through a roof rafter, a single lag bolt may used. In other cases, where the foot is simply screwed into the plywood that comprises the roof deck regardless of rafter location, three or more lag bolts may be used to achieve the requisite strength. In either case, the holes made in the roof by the one or more lag bolts must be sealed to prevent water from leaking in around the threads of the lag and/or to fill any nearby miss-drilled pilot holes.

To deal with this problem, installers have used caulk or other sealant, typically dispensed from a separate tube or caulk gun to fill these holes as the installation proceeds. This can be messy for the installer, requires a separate large and bulky tool (e.g., caulk gun), and requires another product SKU to be stocked in the truck's inventory. Moreover, there is no way to ensure that the installer remembers, or even he does remember, that he actually applies caulk or sealant to the lag holes. Therefore, there exists a need for photovoltaic mounting systems that provide reliable and controlled sealing of any penetrations of the roof while minimizing mess and installer mishaps.

BRIEF SUMMARY

In one aspect, a sealant injection mounting system includes at least one photovoltaic mounting bracket and a sealant injection package. In some embodiments, the mounting bracket includes a lower base portion adapted for mounting on a roof surface with one or more fasteners, such as a lag bolt, and an upper support portion adapted for supporting a photovoltaic module or associated support component, such as a track or rock-it type coupling component. The sealant injection package includes a collapsible sealant reservoir containing a flowable sealant within. The sealant injection package is adapted for directionally controlled release of the flowable sealant upon collapse of the reservoir so as to seal any penetrations and form a chemical flashing on the roof surface. In some embodiments, the sealant injection package is separable and removable from the mounting bracket so that the sealant injection package can be assembled by a user with the mounting bracket or replaced or exchanged as needed. In some embodiments, the sealant injection package is provided to the user separately or may be compatible for use with differing types of mounting brackets.

In some embodiments, the system includes a compressing plate disposed adjacent the collapsible sealant reservoir of the sealant injection packaging. The compressing plate includes a through hole through which the lag bolt extends so that tightening of the lag bolt into the roof surface during mounting of the bracket to the roof surface moves the plate against the collapsible reservoir, which compresses the reservoir and effects directionally controlled release of the flowable sealant between the base portion and the roof surface and around the portion of the lag bolt penetrating the roof surface. In some embodiments, the compressing plate can include any of a head of the lag bolt, a washer, a nut, an upper plate of the sealant injection package, a cap or plate disposed atop the sealant injection package and separable therefrom, or any combination of these features.

In some embodiments, the sealant injection system includes a sealant guide for directing flow of the flowable sealant delivered from the reservoir during collapse between the base portion and the roof surface and around a portion of the lag bolt extending through the roof surface. The sealant guide can include any of: a hole or slot defined in a bottom surface of the base portion of the bracket and a shaped component disposed along a bottom of the sealant injection package or a combination of these features. The shaped component can be an integrated feature along the bottom of the sealant injection package or a separable component of the sealant injection package that releasably couples with each of the base portion of the bracket assembly.

Such sealant guides can include one or more coupling features for coupling to the bracket and/or the sealant injection package and may define an interior sealant flow path to direct flow of sealant to a desired location upon collapse of the collapsible reservoir of the sealant injection package.

In some embodiments, mounting bracket includes an integral component having a base portion adapted for mounting on the roof surface with one or more lag bolts and a support portion adapted for coupling with a photovoltaic coupling, the support portion protruding away from the roof surface when the base portion is mounted on the roof surface.

In some embodiments, the sealant injection package a includes a rigid or semi-rigid outer shell and a frangible portion in fluid communication with the interior of the sealant reservoir and through which the flowable sealant is released when the reservoir is collapsed. The outer shell can be defined as a cylindrical shell with multiple tiers dimensioned to nest within one another so as to collapse the reservoir when the lag bolt is torqued into the roof. The clamping plate can be defined as a cylindrical cap positioned atop the sealant injection package and below a head or a nut of the lag bolt such that when the lag bolt is torqued against the roof, the cap covers the collapsed sealant injection package.

Some embodiments further include a sealant guide adapted to releasably couple with the base portion of the bracket along an upper side and to releasably couple with a bottom side of the sealant injection package and to releasably couple with a bottom side of the sealant injection package. The sealant guide can be adapted so as to define a flow path that directs flow of sealant upon collapse of the reservoir between the base portion and the roof surface and around a portion of the lag bolt that penetrates the roof surface. Such embodiments can further includes a planar spacer, such as foam pad or disc, adapted for placement between the base portion of the bracket and the roof surface. The spacer includes a through hole for the lag bolt to extend through a defined an interior enclosed space between the base portion of the bracket and the roof surface so as to contain flow of sealant within the space upon collapse of the sealant reservoir.

In some embodiments, the mounting system includes a specialized lag bolt adapted to allow removal of the bracket after mounting of the bracket on the roof. Such a lag bolt can include a threaded portion at both opposing ends so that a nut positioned on the top end allows for torquing of the lag bolt into the roof during installation. Such a lag bolt can further include a an intermediate portion with a polygonal cross-section to allow removal of the lag bolt if desired and a distally tapered portion disposed distal of the intermediate shaft portion dimensioned to break the sealant guide to allow flow of adhesive into the space defined by the spacer.

In some embodiments, the sealant injection package includes a cylindrical piston with a through-hole to allow passage of the lag bolt and a piston portion that is engaged when a lag bolt is torqued down through the at least one photovoltaic mounting bracket thereby compressing the collapsible sealant reservoir and injecting sealant between the mounting bracket and a roof surface and around the lag bolt along the roof penetration. The cylindrical piston can include a rigid or semi-rigid out shell, the collapsible cylindrical reservoir dispose within, a disc atop the cylindrical reservoir for compressing the collapsible reservoir, and a frangible portion along the bottom of the cylindrical reservoir to effect directionally controlled release of the sealant upon collapse of the reservoir. The cylindrical piston-type sealant package can further include a sealant guide integrated with the piston. Such a sealant guide can include a protruding ridge along the bottom of the sealant injection package that interfaces with a hole or slot in the base portion of the bracket.

In some embodiments, the system includes a mounting bracket assembly having a base portion defined by a rectangular extrusion having a lengthwise channel on a bottom side and a sealant injection package that can be removably position within the base portion. The sealant injection package can include one or more collapsible sealant reservoir packets; and a carrier for supporting the packets, wherein the carrier is slidable into the channel of the base portion to allow insertion, removal and/or replacement of the sealant reservoir packets.

In some embodiments, the sealant injection package includes a collapsible cylindrical sealant reservoir containing a flowable sealant, the reservoir surrounding a through passage extending longitudinally through which the lag bolt extends during installation, an outer cylindrical shell in which the sealant reservoir is disposed; and a disc atop the cylindrical sealant reservoir so as to effect uniform collapse of the reservoir when the disc is compressed against the sealant reservoir. The outer shell can include multiple tiers dimensioned so as to nest within one another so as to collapse the reservoir when the lag bolt is torqued into the roof.

In some embodiments, the mounting system includes at least one photovoltaic mounting bracket including a surface adapted to rest on a roof surface; at least one reservoir of sealant mechanically coupled to the at least one photovoltaic mounting bracket; and a piston portion that is engaged when a lag bolt is torqued down through the at least one photovoltaic mounting bracket thereby compressing the at least one reservoir and injecting the flowable sealant between the at least one mounting bracket and the roof surface and around the lag bolt.

In some aspects, the mounting systems are adapted for use with a sealant injection system that provides improved directional release of sealant to seal any roof penetrations while substantially containing the released sealant within the components of the system, thereby reducing or elimination any mess and drastically improving ease of installation. In other aspects, the sealant injection systems described within can be readily positioned within or removed from the associated mounting bracket to allow for ready assembly, replacement or exchange of sealant injection systems as desired. Such configurations allow sealant injection packages to be provided separately as needed for a particular application or as required for the environmental conditions of a geographical area in which the mounting systems are being installed.

BRIEF DESCRIPTION OF THE DRAWINGS

FIG. 4 is a partial cut-away view showing internal structure of a lag bolt sealer injector system in a photovoltaic mounting system according to various exemplary embodiments of the invention.

FIG. 5 is bottom view of a photovoltaic mounting system for use with the lag bolt sealer injector system according to various exemplary embodiments of the invention.

FIG. 6 is a sealant injector packet for a photovoltaic mounting system according to various exemplary embodiments of the invention.

FIG. 7 is an end view of a photovoltaic mounting system including a lag bolt sealant injector after a lag bolt has compressed the sealant packet according to various exemplary embodiments of the invention.

FIGS. 14A-14B are internal cut-away views of the elements shown in FIGS. 12 and 13, including the mechanism that permits the center tube to collapse according to various exemplary embodiments of the invention.

FIG. 22A illustrates removal of the bracket assembly after mounting of the photovoltaic mounting system of FIG. 15 and replacement with another mounting bracket, respectively on the same lag bolt sealed shown in FIG. 22A.

FIG. 22B illustrates replacement of the mounting bracket removed in FIG. 11A with another mounting bracket on the same lag sealed lag bolt.

DETAILED DESCRIPTION OF THE INVENTION

Figure 1:
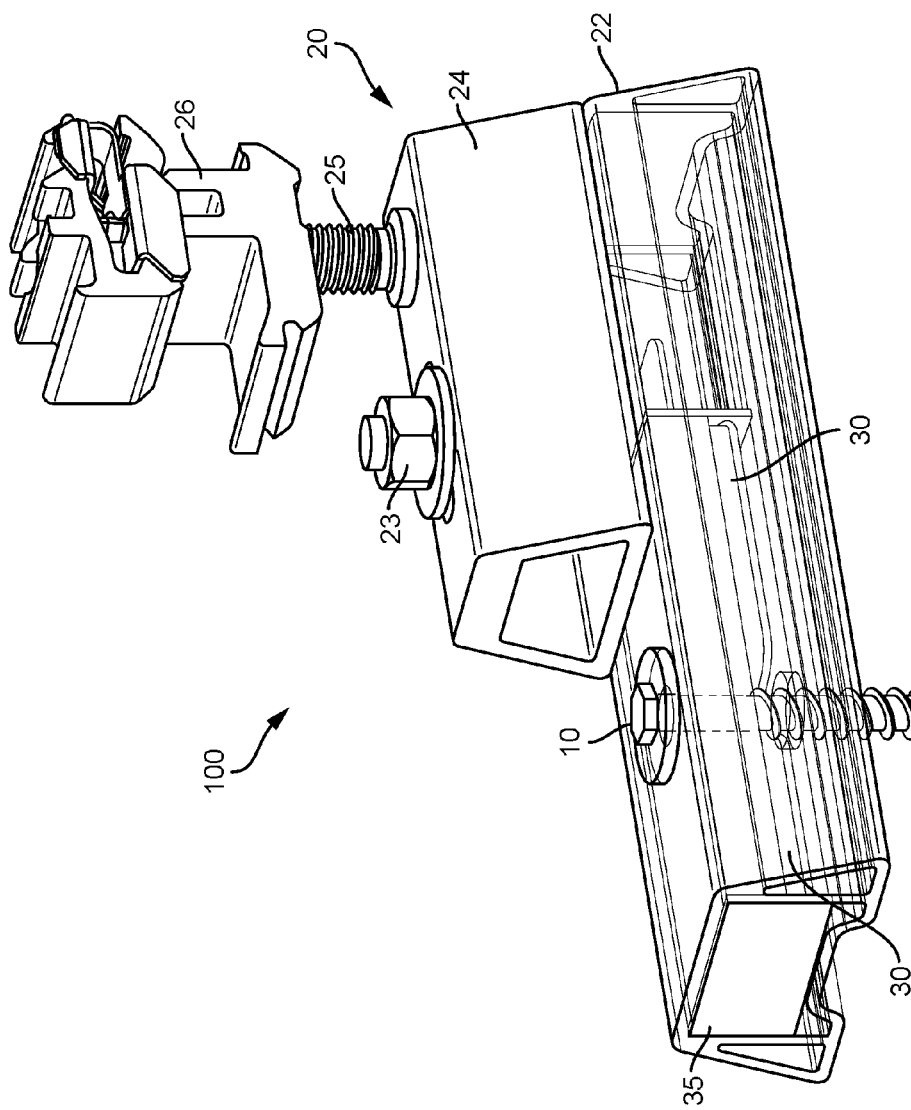
FIG. 1 is a side-facing perspective view of a photovoltaic mounting for use with the lag bolt sealer injector system according to various exemplary embodiments of the invention.
Figure 2:
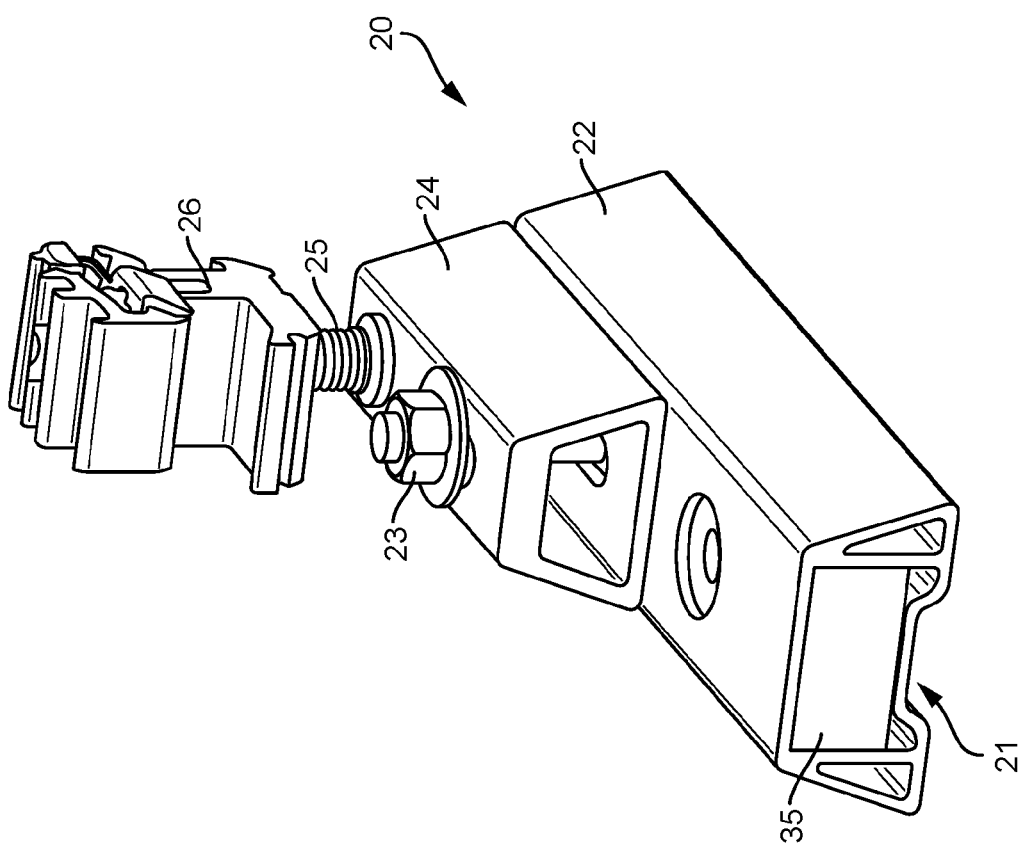
FIG. 2 is a front-facing perspective view of the photovoltaic mounting system for use with the lag bolt sealer injector system according to various exemplary embodiments of the invention.

The present invention seeks to ameliorate some if not all of the shortcomings of the prior art with a photovoltaic mounting system that includes a sealant reservoir and injector mechanism that automatically controls injection of sealant in and around a lag hole as a lag bolt is torqued down to attach the photovoltaic mounting hardware to the roof. In various embodiments, the lag bolt may engage a piston or other structure that comprises a package containing sealant and force sealant to flow between the mounting hardware and the roof surface as the lag bolt is torqued down. In various embodiments, the photovoltaic mounting system may come pre-loaded with the injector system so that the installer can guarantee that sealant is applied to every lag bolt, regardless of whether the installer intentionally does so. In other embodiments, the sealant reservoir is separable from the mounting bracket so that the sealant reservoir can be replaced as needed or assembled according to differing specifications before shipment of the mounting system to the user.

The attached Figures illustrate several injector systems useable with specific photovoltaic mounting systems, however, these illustrated embodiments are exemplary only. It should be appreciated that the broader concept of an integrated lag bolt sealant injector that controls injection of sealant during mounting of a fastener may take many different forms beyond those shown here and may be usable with many different roof-top photovoltaic mounting systems without departing from the spirit or scope of the invention.

Referring now to FIGS. 1-7, these figures all illustrate various views of a particular exemplary embodiment of a lag bolt sealant injector system combined with a particular exemplary embodiment of a photovoltaic mounting system. System 100 includes bracket assembly 20 for securing a photovoltaic module to a roof surface with lag bolt 10 and a pair of sealant reservoirs 30 carried within removable plastic carrier 35. The bracket assembly 20 depicted in these figures is a two-piece system that comprises base portion 22 (e.g. an extruded Aluminum foot) that is designed to rest on a planar roof surface and upper foot assembly 24 that rests of the foot portion and that includes an integrated photovoltaic module coupling device 26 such as the rock-it style connector shown in FIG. 1-3. It should be appreciated that coupling device 26 is exemplary only and that in various embodiments, a different coupling device, such as a wrap-around or clamping coupling device may be used without departing from the spirit or scope of the invention. Upper foot assembly 24 is movable with respect to the foot via a slot formed in the top and bottom of the upper foot assembly that allows a bolt to pass through, such as carriage bolt 23-1 depicted in FIGS. 3 and 4. Other fastening mechanisms may be used to allow the upper foot assembly to pivot with respect to base portion 22. In the embodiment shown in these figures, a locking nut and washer firmly secure upper foot assembly 24 to base portion 22.

It should be appreciated that the photovoltaic mounting system shown in FIGS. 1-8 may be utilized alone, that is without the lag bolt sealant injector system of the present invention, however, it is illustrated with such a system merely to highlight the utility of integrated lag bolt sealing and to explain how the sealant injector may be activated by simply applying torque to a mounting system lag bolt. It is further appreciated that the lag sealant injection system is removable from the bracket such that it can be assembly prior to shipping, for example if the sealant has limited shelf-life, or can be selected from a plurality of different sealants according to required specification as needed. For example, when shipping to colder climates with below freezing temperatures, sealant injection systems that utilize sealants that can withstand such temperature can be used. In another aspect, use of a removable sealant injection system allows a user or supplier to switch out or replace the sealant injection system or individual sealant reservoirs as needed or to supply the systems or sealant reservoirs separately.

Figure 3:
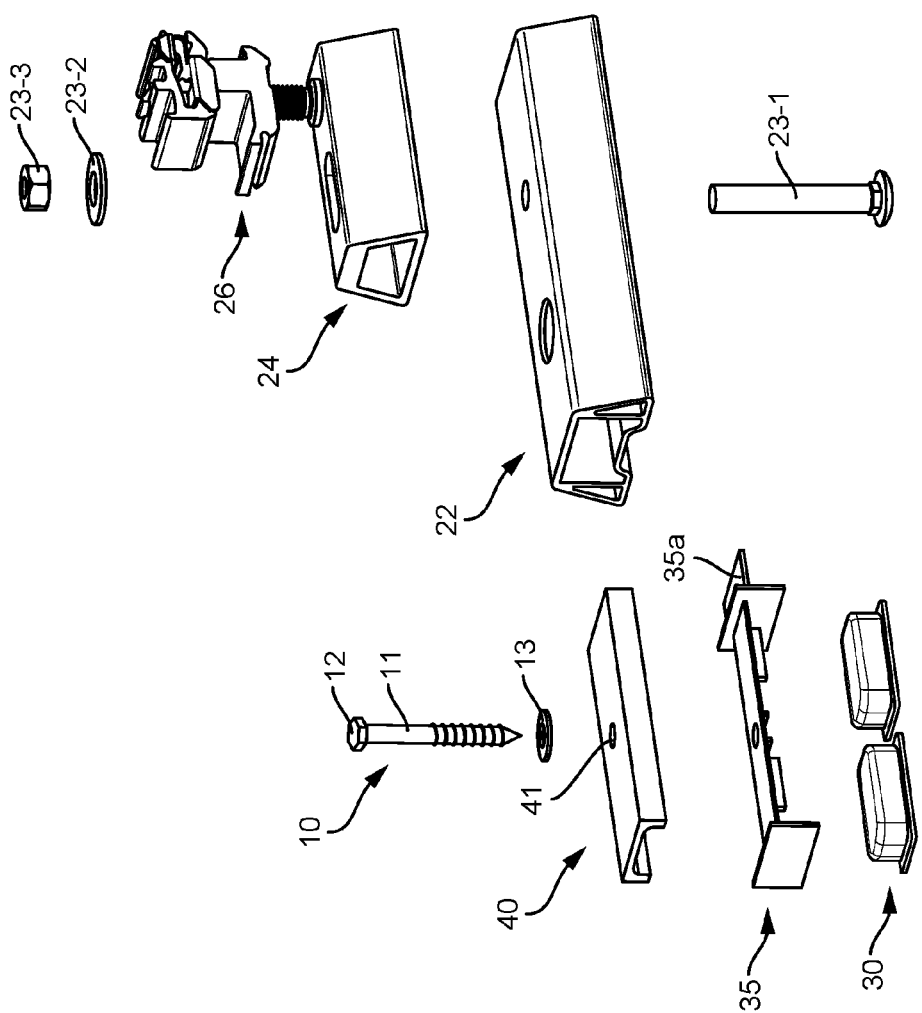
FIG. 3 is an exploded view of a photovoltaic mounting system for use with the lag bolt sealer injector system according to various exemplary embodiments of the invention.

In various embodiments, the injection system comprises one or more compressible or collapsible sealant reservoirs adapted to provide directional release of the sealant from the reservoir upon collapse or compression of the reservoir. In some embodiments, the sealant reservoirs or packets have a compressible shell portion and a portion having a foil or other thin, breakable layer that allows sealant to flow out when the shell portion of the packet is compressed. The sealant reservoirs may be dimensioned to be received within the bracket or associated carrier in a particular orientation so that the foil or breakable layer is positioned to provide directionally controlled release of the sealant. In addition, the compressible shell portion may be formed of a material that is semi-rigid or rigid, such as a hardened plastic, so as to provide sufficient rigidity to inhibit inadvertent collapse of the reservoir and release of the sealant during handling and shipment of the reservoirs, yet sufficiently weak to allow compression or collapse of the reservoir when subjected to a force sufficient to drive a lag bolt into the roof surface. As shown in FIG. 3, sealant reservoir carrier 35 may be used to load the one or more packets into the foot of the photovoltaic mounting system or to replace or interchange the sealant reservoirs as needed.

Internal clamp plate 40 and/or other force spreader along with lag bolt through-hole 41 functions as a piston to compress sealant packet(s) 30 positioned under clamp plate 40 when an installer lags foot 22 into a roof surface by tightening lag bolt 10. In the embodiment of FIGS. 1-8, sealant reservoir carrier 35 includes a tab 35a with a hole for engaging the carriage bolt 23-1 that attaches the upper foot assembly to the foot. One benefit of this configuration is that it provides a mechanism for holding the sealant packet(s) 30 in place until the mounting system is installed. This is shown in greater detail in FIG. 4.

It should be appreciated, however, that another connector or even an adhesive may be used to prevent sealant packet(s) 30 and clamp plate 40 from falling out of the foot or base portion 22. Also, in a preferred embodiment, the sealant injector assembly is pre-installed in the foot of bracket 20 before the installer receives the system for installation. However, in other embodiments, the sealant injector may be a standalone system usable with a variety of different photovoltaic mounting systems.

Regardless of the particular photovoltaic mounting system utilized with the lag bolt sealant injector system of the present invention, the roof-facing side of the foot or base portion 22 may include a sealant guide feature for controlling release of the flowable sealant during mounting. The sealant guide may be incorporated into the base portion and include an opening, such as slot 29, that encourages the directionally controlled flow of sealant material under the foot within channel 21, as shown for example in FIG. 5 or sealant guide may be a separate component, such as that shown in the embodiment of FIG. 15.

FIG. 6 illustrates one design for a collapsible sealant reservoir or packet 30. In this embodiment, the shell portion 32 is made of thin plastic, much like a food service packet, while the top portion (bottom facing when installed) is covered with a foil or other frangible or breakable material 31 that provides an airtight seal but is also easily punctured and/or ruptured, particularly when compressed by the action of a lag bolt pushing down on a piston. This effect is illustrated, for example, in FIG. 7. Torquing down of lag bolt head 12 in turn pushes the clamp plate 40 down until a bottom foot 40A of the clamp plate 40 abuts against the interior of the base portion 22, which, in turn, compresses plastic carrier 35 and injector packets 30 causing sealant to flow out under the bottom of the foot. In the example shown in FIGS. 1-7, foot or base portion 22 is formed with recessed gap or channel 21 to create a void for the flowable sealant 1 to flow into around lag bolt 10 so as to seal hole H in roof surface R through which lag bolt 10 extends as well as any adjacent pilot holes ph.

Figure 8:
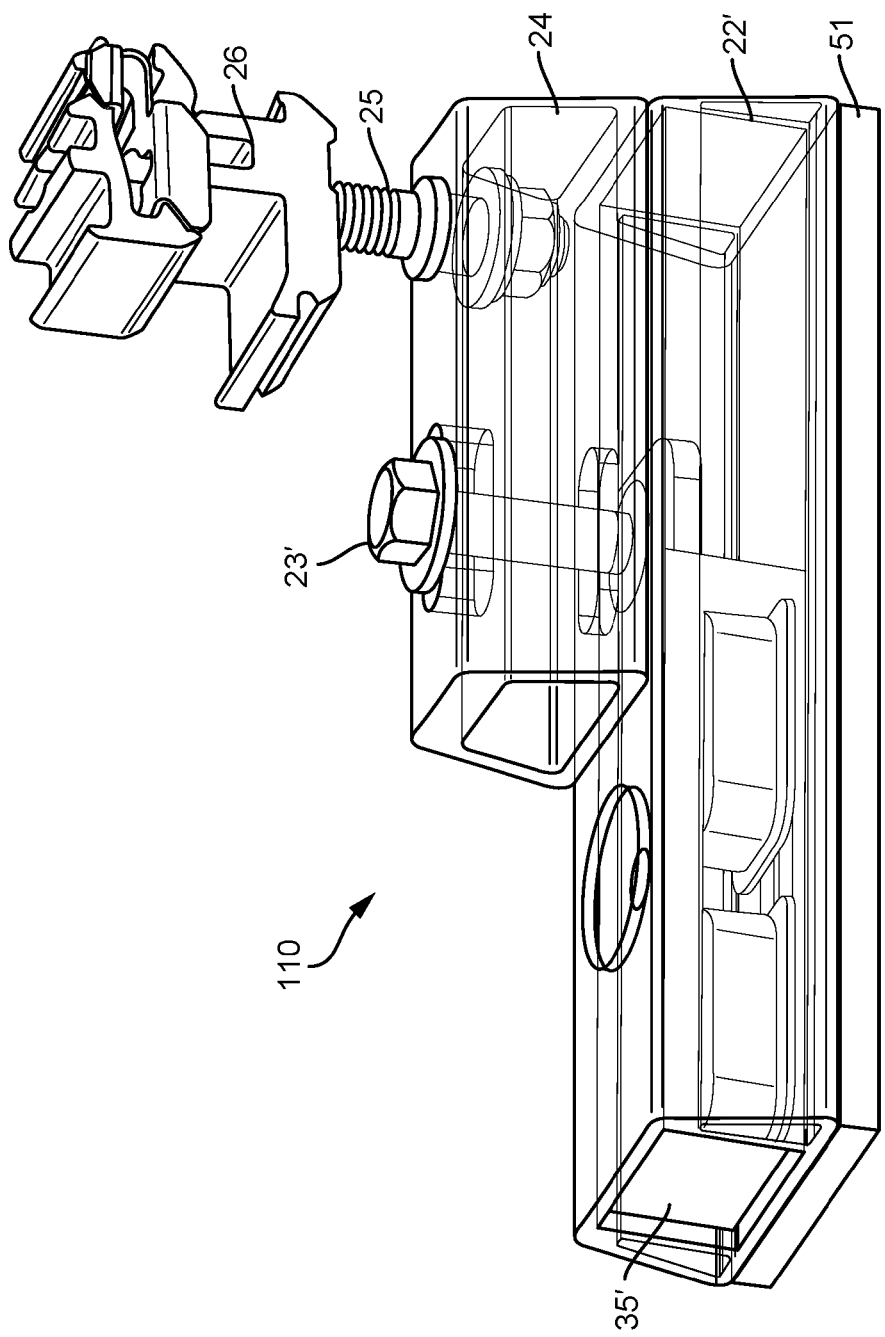
FIG. 8 is a side-facing perspective view of another photovoltaic mounting system including a lag bolt sealant injector system according to various exemplary embodiments of the invention.
Figure 9:
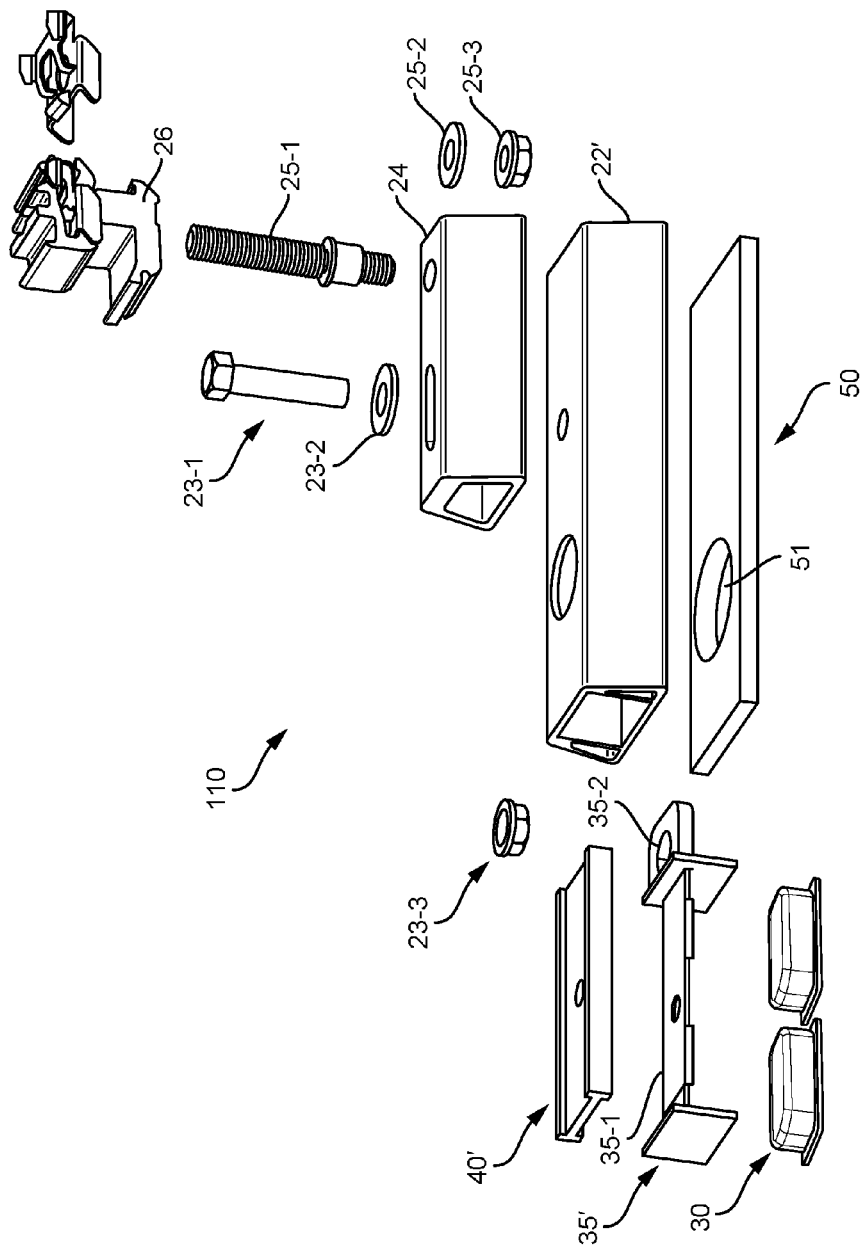
FIG. 9 is an exploded view of another photovoltaic mounting system for use with a lag bolt sealant injector system according to various exemplary embodiments of the invention.

FIGS. 8 and 9 illustrate another exemplary photovoltaic mounting system 110 for use with a lag bolt sealant injector system according to another exemplary embodiment of the invention. The system shown in FIGS. 8 and 9 is similar to that of FIGS. 1-7 with a few notable differences. Referring to FIG. 9 in particular, an exploded view of photovoltaic mounting system 110 with lag bolt sealant injector system, in this exemplary embodiment, the upper foot assembly 24 attaches to foot or base portion 22' with bolt 23' that is fed from the top of the upper assembly 24, passing through the foot 22' and into the plastic carrier 35' which is holding a flange nut 23-3 in tab 35-2 of carrier 35'. The advantage of flange nut 23-3 in this embodiment is that the flange keeps the nut seated in plastic carrier 35' with the threads facing upwards so that the fastener can be dropped down through the upper foot and assembly and foot into the nut which engages the inside of base portion 22' (e.g lower main extrusion foot). This configuration holds the injector system in place while also joining the upper portion and base portion. Each of the upper and base portions may be formed as an extrusion, such as from a formable metal or metal alloy, for example, an Aluminum extrusion.

Also, instead of having a channel formed in the underside of the foot or base portion (e.g. lower main extrusion), system 110 shown in FIG. 9 includes a base portion 22' that is flat on the bottom but incorporates spacer 50, such as a foam pad with circular cutout 51 to accommodate a lag bolt as well a volume of sealant material around the lag bolt. Spacer 50 not only provides a space for the flowable sealant to flow into, but also contains any excess sealant to inhibit flow of sealant onto the roof surface. Use of spacer 50 can also protect the sealant from exposure to the elements (e.g. rain or UV exposure), which can extend the useful life of the sealant and ensure adequate sealing is maintained over time. A foam pad as spacer 50 may also be useful in applications where the base portion (e.g. lower main extrusion or foot) passes over an uneven seam between two subsequent courses of shingles by compensating for any uneven surface along the seam as the lag bolt is torqued down. Another feature of the embodiment shown in FIG. 9 is that clamp plate 40' is H-shaped rather than C-shaped which may enable clamp plate 40' to fit more snugly against plastic carrier 35 and prevent inadvertent movement of the sealant injection package within the base portion 22'. Otherwise, the mechanism of injecting sealant is essentially the same—by lagging down the foot to the roof surface with a lag bolt, the plate compresses the carrier and one or more sealant packets causing sealant to flow under the foot and around in the lag bolt in the opening pre-cut in the foam pad.

Referring now to FIGS. 10A-14, these figures illustrate exemplary lag bolt sealant injector system 120 that can be used with a different exemplary photovoltaic mounting system. Although the inventive principle of injecting sealant around a lag bolt through the action of torquing down the lag bolt against a plunger which in turn compresses a sealant container is the same, the form factor of both the photovoltaic mounting system and fluid injector is somewhat different than that shown in FIGS. 1-9.

Figure 10A:
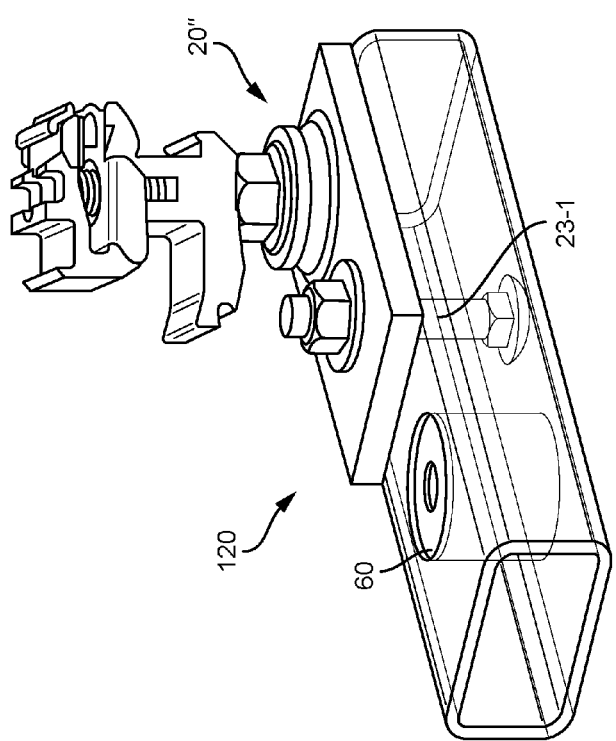
FIGS. 10A-10B are perspective views of another photovoltaic mounting system including a lag bolt sealant injector system according to various exemplary embodiments of the invention.
Figure 10B:
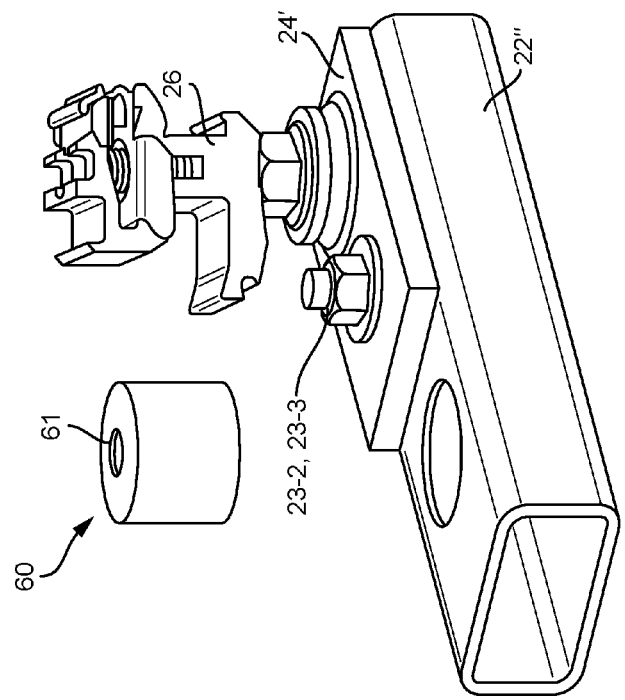

FIGS. 10A-10B are perspective views of tubular photovoltaic mounting system 120 that includes bracket mounting assembly 20" and piston-type sealant injector package 60, which is inserted into a circular opening formed in the foot or base portion 22" of bracket 20" through which the lag bolt is also inserted. In the image on the left, 10A, base portion 22" or foot has been made translucent so that piston-type sealant injector package 60 is visible seated within mounting system 120. FIG. 10B illustrates piston-type sealant injector package 60 removed from base portion 22" such as may occur when the package is being assembled, replaced or exchanged with another type of injector package or sealant.

In this embodiment, bracket mounting system 20" comprises a foot or base portion 22" and upper assembly 24' including a two-sided photovoltaic module coupling device 26, such as the rock-it connector shown in FIGS. 10A-10B. It should be appreciated that other module coupling devices such as wrap-around or clamping style coupling devices as are known in the art may be used without departing from the spirit or scope of the invention. Upper assembly 24' and base portion 22" are joined by carriage bolt 23-1 that sits in the bottom of base portion 22" or foot facing up and penetrates a slot formed in the upper assembly 24' so that it can be secured with a washer 23-3 and locking nut 23-2. Piston-style sealant reservoir 60 is adapted to be received within a corresponding hole within base portion 22" and can be removed as shown in FIG. 10B such that the sealant reservoir can be exchange or replaced as needed. In some embodiments, the system is provided to a user with piston-style sealant reservoir 60 include in base portion 22", while in other embodiments piston-style sealant reservoirs 60 may be provided separately. The top surface of base portion 22" includes an enlarged hole through which the piston-style sealant reservoir 60 can be inserted and a smaller hole on a bottom surface through which the lag bolt extends into the roof surface and which interfaces with a sealant guide 64 on the underside of the piston-style sealant reservoir 60, as can be understood further be referring to FIGS. 11A-11B.

As seen in FIGS. 11A-14, in this embodiment, piston-type sealant injection package 60 is defined as a cylindrical structure with lag bolt through-hole 61 passing through the middle, with sealant contained within the ring surrounding the through-hole. While shown as cylindrical, it is appreciated that this concept can be defined in various other shapes, such as squares, polygons or various other shapes as desired.

Figure 11B:
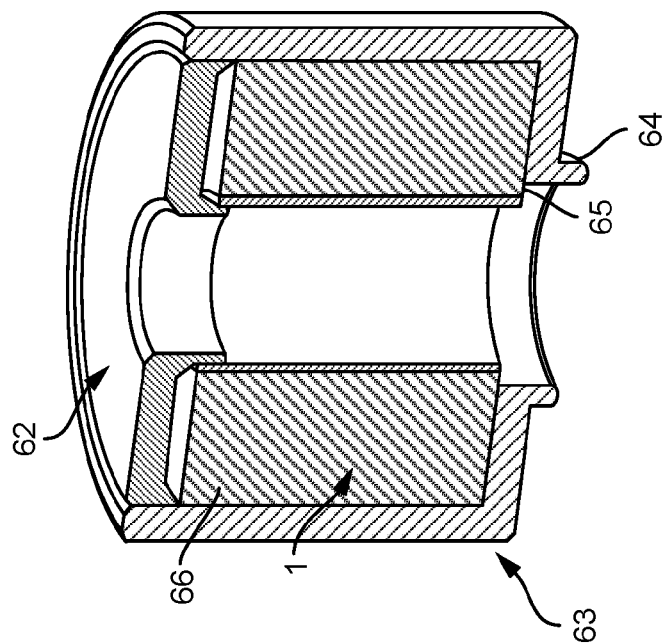
FIG. 11A-11B illustrates an external and a partial cut-away view, respectively, of a lag bolt sealant injector according to various exemplary embodiments of the invention.
Figure 11A:
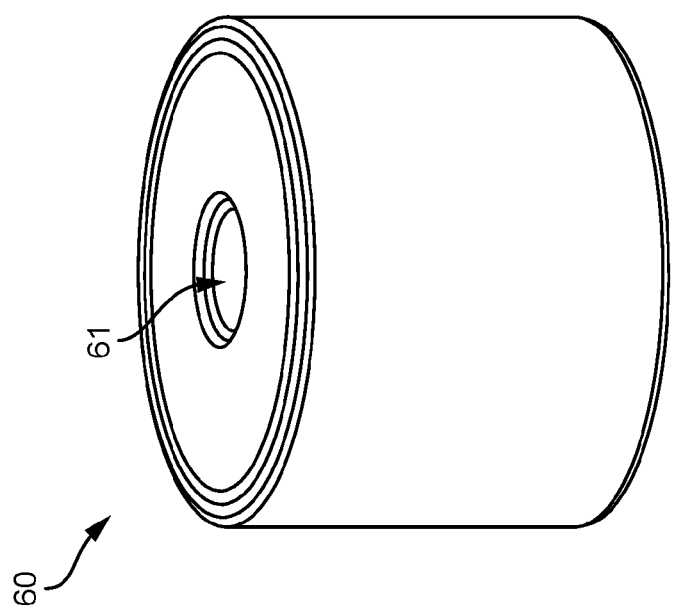

FIG. 11B illustrates the internal structure of an example sealant injector package defined as a piston-type sealant injection package 60 according to this embodiment of the invention. Flowable sealant 1 is retained between the inner and outer wall of the cylinder with a piston formed by disc 62 on top that is capable of sliding down within the cylinder thereby releasing sealant 1 through the lag bolt through-hole 61 along the bottom. Sealant guide collar 64 at the bottom of the injector package fits inside the lag bolt opening formed in the bottom of foot or base portion 22", serving to hold the package in place and also to provide a flow path capped with a frangible portion defining flow path outlet 65 that allows the sealant to escape after the piston is compressed by the action of the lag bolt. Sealant guide collar 64 is adapted to control and direct flow of sealant from the reservoir between base portion 22" and the roof surface and around a portion of the lag bolt that protrudes through the roof surface. Sealant guide collar 64 may be defined as a lip that circumscribes the inner diameter of through-hole 61 of piston-style sealant injection package 60 and includes frangible portion flow path outlet 65 that breaks when sufficient pressure is applied to top plate 62 of the piston to collapse the collapsible cylindrical reservoir 66 containing flowable sealant 1. Sealant 1 is then directed through flow path outlet 65 along sealant guide collar 64 around the lag bolt so as to seal the hole in the roof surface through which the lag bolt extends as well as any adjacent pilot holes.

Figure 12C:
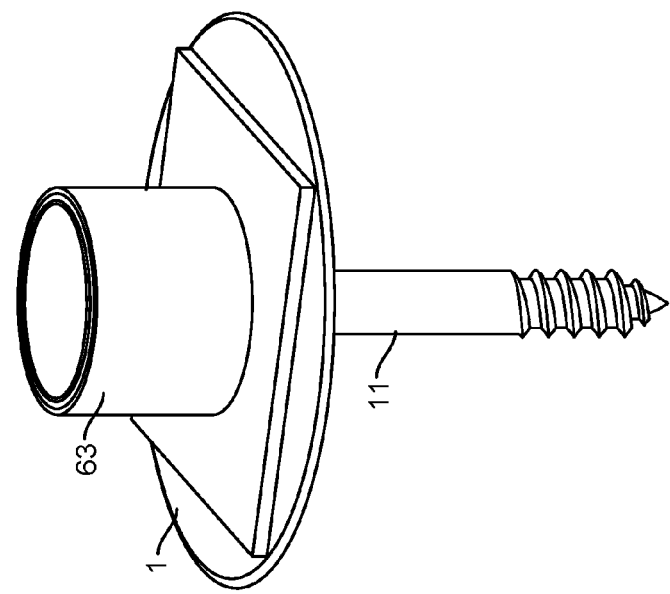
FIGS. 12A-12C illustrates several detail views of the injection mechanism of a lag bolt sealant injector according to various exemplary embodiments of the invention.
Figure 12B:
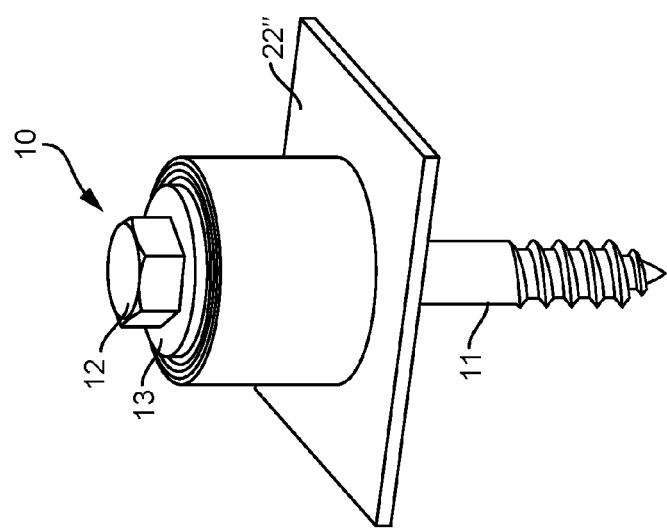
Figure 12A:
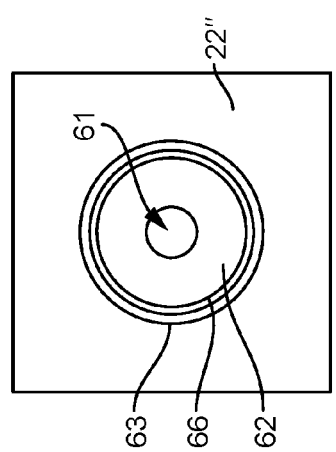
Figure 13A:
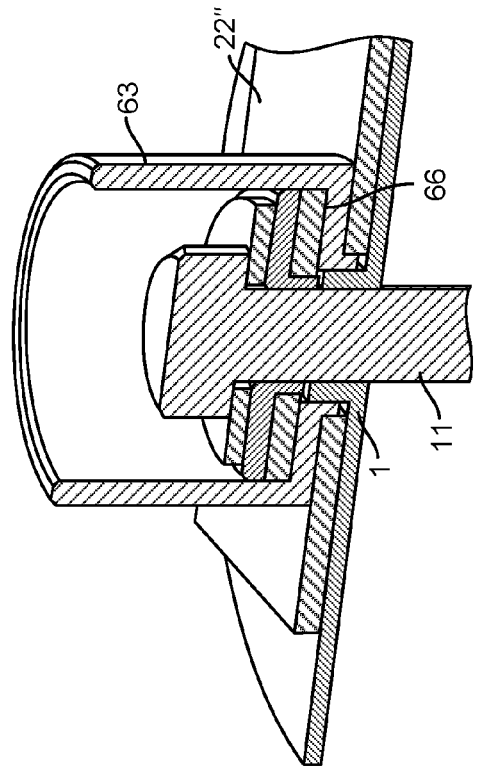
FIGS. 13A-13B illustrate a partial cut-away view of the elements shown in FIG. 12 before and after collapse of the sealant reservoir by torquing of the lag bolt into the roof.
Figure 13B:
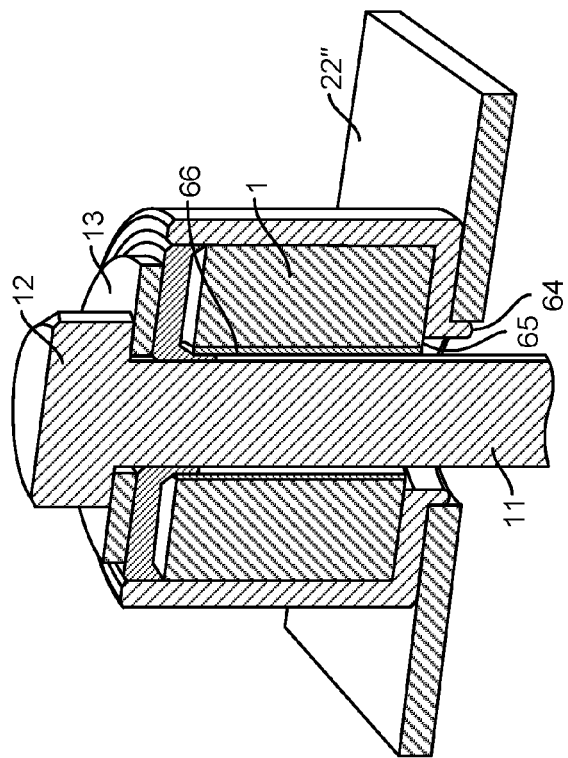

FIGS. 12A-12C illustrate several view of piston-style sealant injection package 60 during mounting of system 120. These views remove the majority of the structure of the photovoltaic mounting system 120 to emphasize the position and action of the piston-type sealant injector package 60. After a suitable pilot hole has been drilled, the lag bolt is simply dropped into the lag-bolt through hole 61 of the piston-type sealant injector package 60 and passes through the bottom of foot or base portion 22" and into the pre-drilled lag bolt hole. As shown in FIG. 12A, center hole 61 in piston-style sealant package 60 is open such that the user can see the pilot hole through package 60. As lag bolt 10 and, optionally washer 13, are torqued down, the washer and lag bolt head 12 push down on piston plate 62 which in turn pushes down on collapsible sealant reservoir 66 contained within package 60, collapsing the inner wall so that sealant 1 flows out through the sealant guide collar 64 at bottom and under the base or foot portion around the critical lag bolt hole in the roof surface. This is shown in even greater detail in the cross-sectional side views of FIGS. 13A-13B and 14A-14B. Before torquing against the sealant injector, lag bolt head 12 and washer 13 sit on piston plate 62. As lag bolt 10 is further torqued, piston plate 62 maintains its shape but compresses the center tube or wall of cylindrical reservoir 66 out of the way, while at the same time squishing sealant 1 out of flow path outlet opening 65 along the sealant guide collar 64 around where lag bolt 10 protrudes through the roof surface.

As in previous embodiments, it may be desirable to form a channel or void on the underside of the roof-facing surface of the base portion of the mounting system that can be filled by the sealant without displacing the mounting system. Alternatively, a spacer, such as a foam pad or other structure, may be used to elevate the bracket mounting system 20" above the roof surface with a hole formed therein around the lag bolt opening as shown in the exemplary embodiment of FIGS. 8 and 9.

Figure 15:
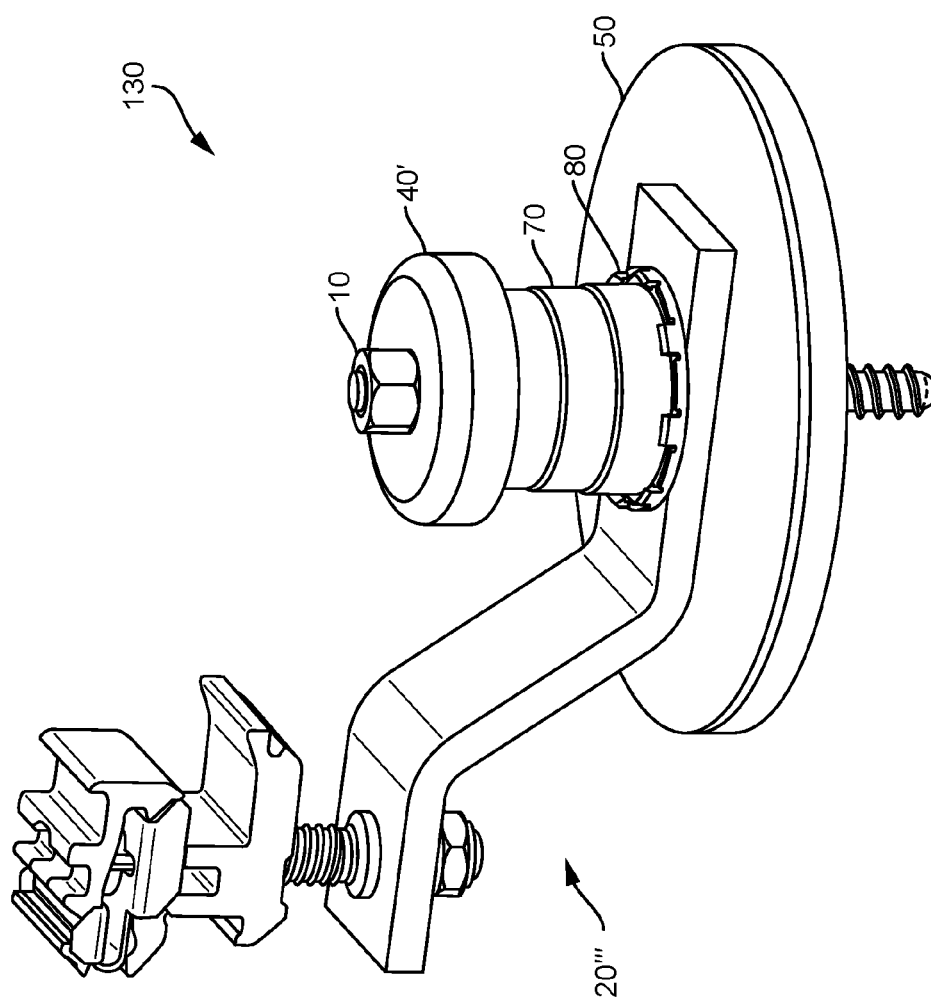
FIG. 15 illustrates another photovoltaic mounting system for use with a lag bolt sealant injector system according to various exemplary embodiments of the invention.

Referring now to FIGS. 15-22B, these figures illustrate exemplary sealant injection mounting system 130 having a simplified integral bracket 20''' and tiered cylindrical sealant injector package 70, as shown in the perspective view of FIG. 15. System 130 also includes sealant guide 80 that secures sealant injector package 70 to bracket 20''' and cylindrical clamping cap 40" disposed atop sealant injector package 70 that covers collapsed sealant injector package 70 after the lag bolt is torqued into the roof surface. System 130 further includes spacer disk 50 adapted for placement between bracket 20''' and roof surface to surround the hole through which the lag bolt extends. Spacer disc 50 can include a recessed interior portion defining an enclosed space into which the sealant can flow around the lag bolt shaft along the penetration through the roof surface. Such a configuration inhibits flow of excess sealant onto the roof surface and avoids exposing the installer directly to the sealant during installation, thereby avoiding any potential mess and improving ease of installation while providing improved sealing of any of roof penetrations and subsequent protection of cured sealant.

Figure 16:
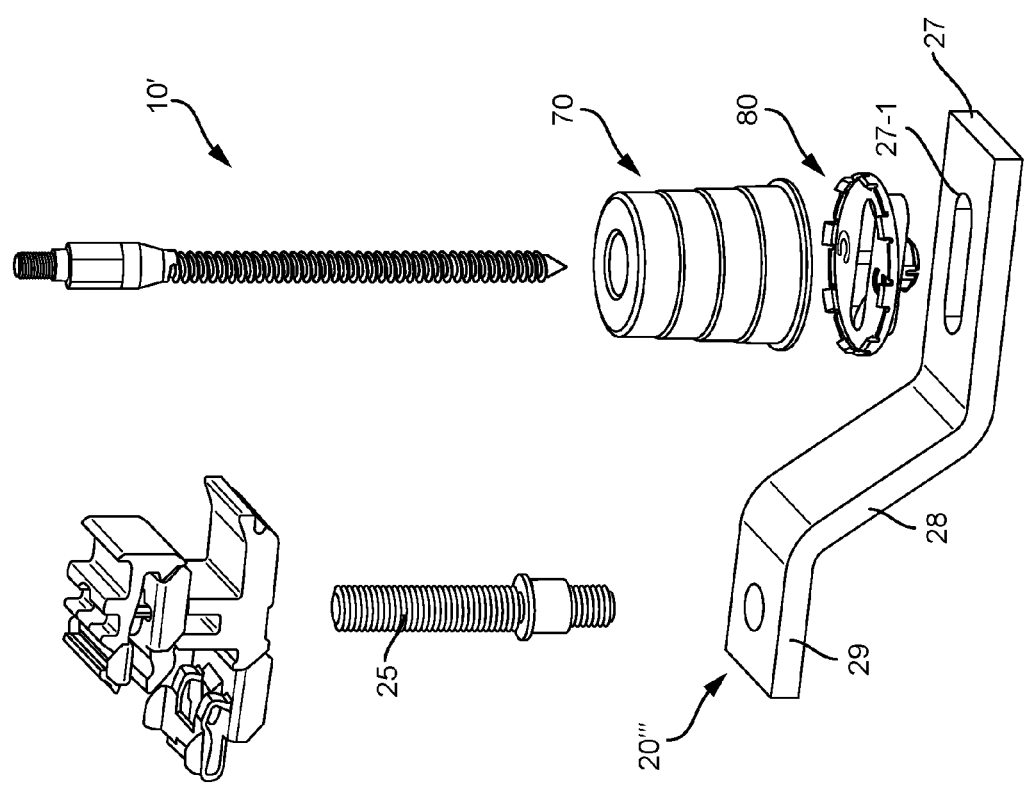
FIG. 16 illustrates an exploded view of the photovoltaic mounting system shown in FIG. 15.
Figure 17:
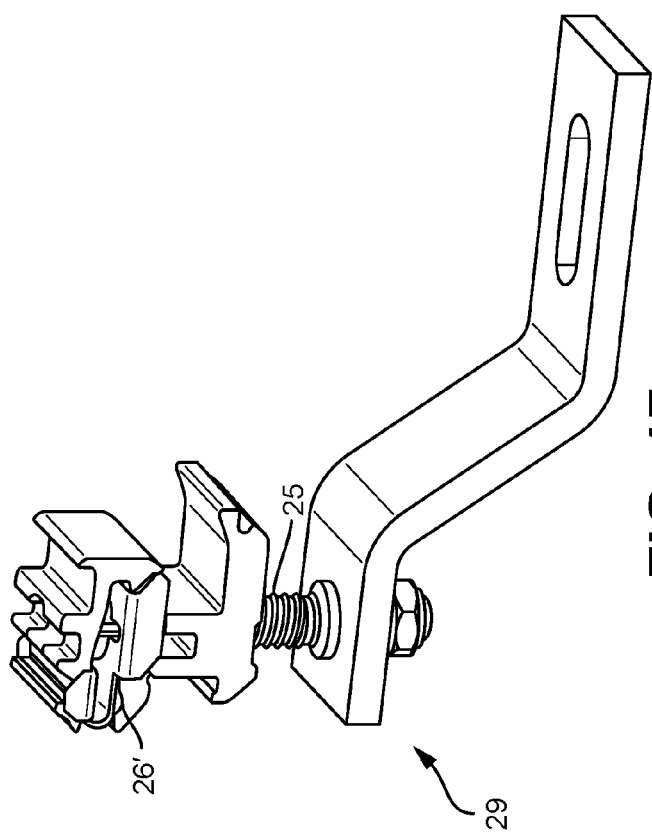
FIG. 17 illustrates a detail view of the bracket of the photovoltaic mounting system shown in FIG. 15.

As can be seen in the exploded view of FIG. 16, integral bracket 20''' includes flattened foot or base portion 27, angled bent-up portion 28 that protrudes away from the roof surface when base portion 27 is mounted on the roof surface, and flattened upper support portion 29 for supporting the photovoltaic panel or associated coupling component. Foot or base portion 27 includes slot 27-1 for passage of lag bolt 10' into the roof surface, and support portion 29 includes through hole 29-1 for passage of fastener 25, such as a bolt, for securing photovoltaic coupling feature 26' to bracket 20''', as shown in FIG. 17. Such coupling features can be adapted for coupling with a portion of a photovoltaic panel or associated support component (e.g. support track) and can include the rock-it style connectors shown in FIG. 1-3 or a different type of photovoltaic module coupling device such as a wrap-around or clamping style connector as is known in the art.

In this embodiment, the bracket assembly is defined as a single integral component, such a bent-up bar with flatted base portion and flattened upper portion. This configuration allows for a smaller leveling foot that is narrower and lighter than the bracket assemblies formed of one or more extruded and/or stamped portions, such as those described above. In some embodiments, the integral bracket is formed of a metal bar having a rectangular cross-section. The metal bar may have a width between about 1 cm and 5 cm in width and between 5 mm to 20 mm in thickness, such as about 6 mm or about 8 mm in thickness. The base portion can be secured to the roof surface with a single lag bolt, such as any of those described herein.

Figure 18:
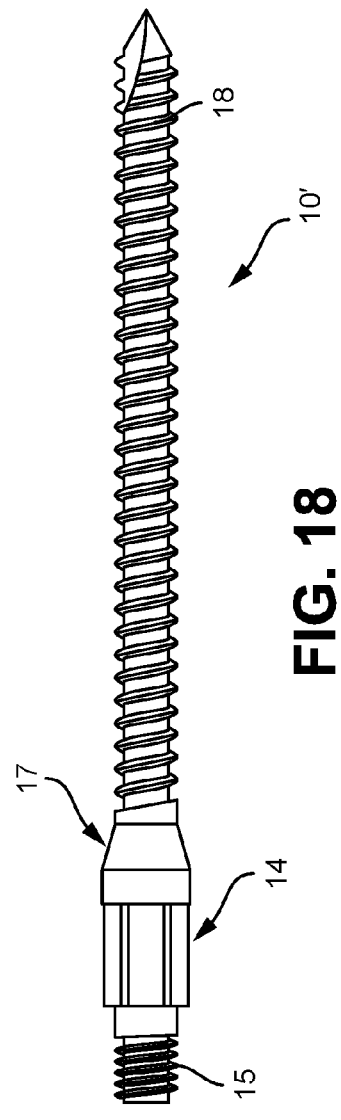
FIG. 18 illustrates a detail view of a specialized lag bolt for use with the photovoltaic mounting system shown in FIG. 15.

In some embodiments, system 130 utilizes a specialized fastener that allows integral bracket 20'' to be removed after mounting to the roof surface without removing the fastener and without disturbing the cured sealant disposed where the fastener penetrates the roof surface. As shown in FIG. 18, such a fastener may be configured as a specialized lag bolt 10' that lacks an enlarged proximal head, such as that shown in the lag bolt 10 of FIG. 1. Rather, specialized lag bolt 10' includes threaded portions at both a proximal and distal ends, 15 and 18 respectively, such that a nut 16 can be threaded onto the proximal end to facilitate torquing of lag bolt 10' into the roof surface. Such a fastener is sometimes referred to in the art as a hanger bolt. A washer can also be used beneath nut 16. Lag bolt 10' can also include an intermediate portion 14 (e.g. polygonal, hexagonal portion) between proximal and distal ends that allows for subsequent removal of lag bolt 10' from the roof surface if desired. In some embodiments, lag bolt 10' can further include distally tapered portion 17 near the proximal end, typically distal of the intermediate portion 14. Distally tapered portion 17 is adapted to facilitate breaking of the sealant guide and to bisect the flowable sealant within the collapsible reservoir of the sealant injection package when driven or torqued into the roof surface to facilitate directionally controlled release of flowable sealant 1 through sealant guide 80, as shown for example in FIGS. 21A-21B. Distally tapered portion 17 may also include a stop surface (not shown), such as may be defined as a ridge or collar, that is disposed near a proximal end of the bolt so as to limit the depth at to which lag bolt 10' penetrates the roof surface. While these aspects are described for use with mounting system 130, it is appreciated that any of these features could be applied to a fastener, such as a lag bolt, and adapted for use with any of the other mounting systems described herein or variations thereof.

Figure 19C:
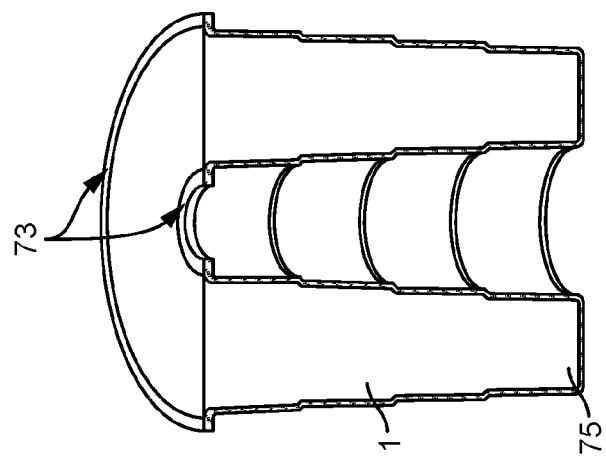
FIGS. 19A-19C illustrate several view of the sealant reservoir for use with the photovoltaic mounting system shown in FIG. 15.
Figure 19B:
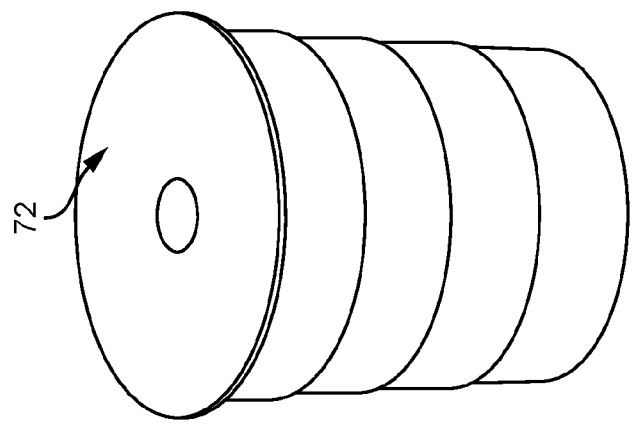
Figure 19A:
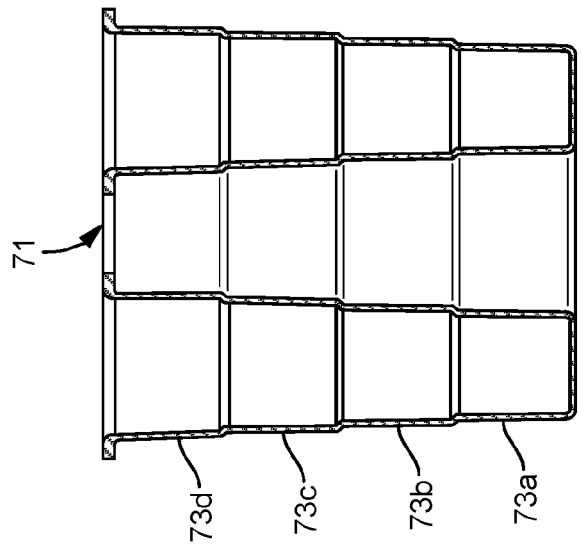

FIGS. 19A-19C illustrate detail views of injection sealant package 70 of the system shown in FIG. 15. Sealant injection package 70 includes a collapsible sealant reservoir 75 containing flowable sealant 1. As shown, package 70 is cylindrical and extends about central tubular passageway 71 extending longitudinally through cylindrical package 70 that allows for passage of a fastener, such as a lag bolt or hanger bolt, therethrough. Injection sealant package 70 includes a tiered outer shell 73 that includes multiple tiers 73a, 73b, 73c, 73d that are stepped or tapered so as to nest within each other and encourage organized collapsed of sealant reservoir 75 when the package is compressed by torquing of the fastener extending therethrough. The bottom of package 70 (shown facing upwards) includes a frangible portion 72 that breaks apart when the package is compressed thereby allowing directional release of sealant therethrough. Frangible portion 72 can include a readily breakable layer or film, such as a foil lid, that may be sealed to the bottom edge of the outer shell, such as with ultrasonic seals, adhesive or other sealing means. Sealant package 70 is oriented relative the bracket 22'' with the bottom of the package facing downwards towards the roof surface so that sealant 1 is directed between the bracket and the roof surface and around the lag bolt shaft where the bolt penetrates the roof surface. The outer shell of sealant injection package 70 can be formed of a rigid or semi-rigid plastic that resists collapse during handling and shipment of sealant injection package 70, but the joints between tiered portions are weak enough to allow collapse of the tiered portions when package 70 is compressed in an axial direction with sufficient force to torque the fastener into the roof surface during mounting. In one aspect, the package 70 may be configured with greater lateral strength than axial strength so as to avoid inadvertent collapse of the reservoir during handling and shipment and facilitate collapse and release of the sealant when properly oriented in the bracket assembly as described and the fastener is torqued into the roof surface.

Figure 20A:
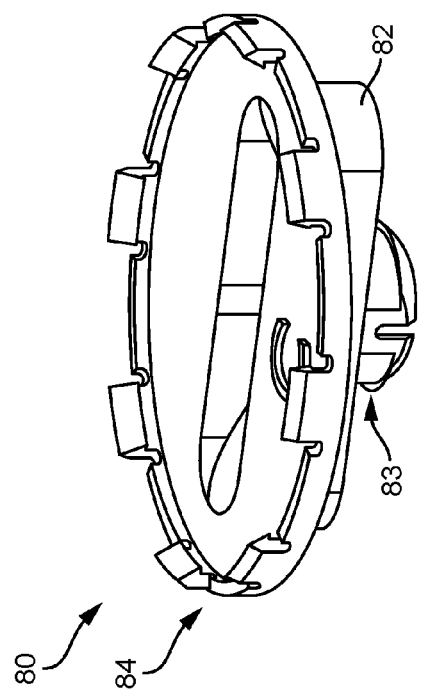
FIGS. 20A-20B illustrate a perspective view and a cross-sectional side view of a sealant guide for use with the photovoltaic mounting system shown in FIG. 15.
Figure 20B:
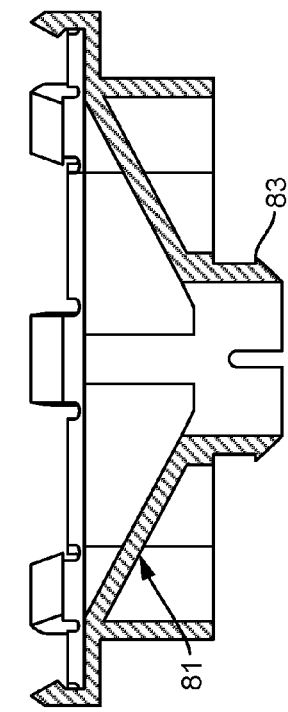

FIGS. 20A-20B illustrate a removable sealant guide 80 adapted for use with injection sealant package 70, as shown in the embodiment in FIG. 15. As shown, sealant guide 80 includes an alignment feature 82 protruding from the bottom surface that interfaces with a corresponding feature within the base portion of the bracket. In this embodiment, the alignment feature 82 is an oblong protrusion that is receiving with a similarly shaped slot within the base portion through which the lag bolt also extends during mounting. Sealant guide 80 further includes coupling feature 84 disposed along the top surface that is adapted for releasably coupling with a bottom surface of sealant injection package 70. In this embodiment, coupling feature 84 includes a snap-fit type feature that resiliently snaps onto an outer ridge along the bottom surface of cylindrical sealant package 70. Sealant guide 80 may also include a lower coupling feature 83 for coupling with an underside of bracket 22''. These features, in combination, secure sealant guide 80 to the bracket and secures sealant package 70 to sealant guide 80 so that a flow of sealant from the collapsible reservoir is released through sealant flow path 81 defined through sealant guide 80. In this embodiment, system 130 further includes a spacer 50', such as a circular foam pad, that circumscribes the hole through which the lag bolt extends and defines a space in which the sealant can flow between the bracket and roof surface and around the lag bolt along the roof penetration. Sealant flow path 81 can be adapted with one or more chutes or ramped surfaces so as to a flow of sealant directionally released from the sealant package to a desired area between bracket 22'' and roof surface.

Figure 21B:
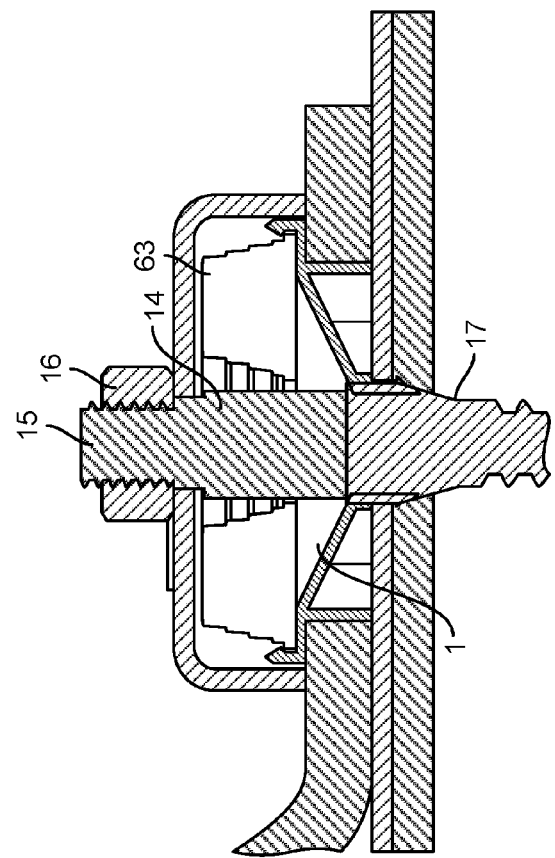
FIGS. 21A-21B illustrate cross-sectional side views of the photovoltaic mounting system shown in FIG. 15 during mounting before and after collapse of the sealant reservoir, respectively.
Figure 21A:
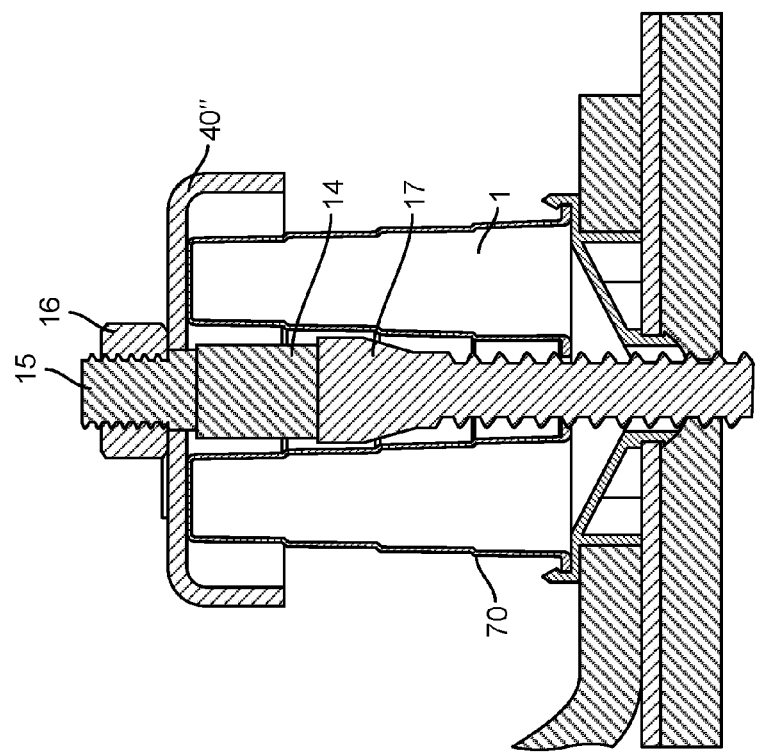

In some embodiments, sealant guide 80 is designed to break apart once the lag or hanger bolt is installed to facilitate flow of sealant through the guide. This action may be effected by use of bolt 10' having a distally tapered portion 17 that engages sealant guide 80 when torqued into the roof surface. This is shown, for example, in FIGS. 21A-21B. FIG. 21A shows system 130 assembled as described above before mounting to the roof surface, the distal tip of lag bolt 10' extending into a hole drilled into the roof surface with flowable sealant 1 contained within sealant injection package 70. FIG. 21B shows system 130 after installation by torquing lag bolt 10' into the roof surface, the tapered portion having broken apart sealant guide 80 and bisecting the sealant or adhesive facilitating controlled flow of sealant between the bracket and roof surface about the roof penetration by the lag bolt.

In some embodiments, system 130 allows for removal of the mounting bracket after installation with the sealant injection package described above. In this embodiment, by removing nut 16 from the proximal threaded portion of the specialized lag bolt 10', compression cap 40", the compressed sealant injector 70 and the bracket can be removed and discarded while lag bolt 10' remains installed within the roof surface, the sealant under the puck or spacer 50' left undisturbed. A new bracket, of the same or different type, can then be installed over the installed lag bolt 10', which remains sealed with cured sealant 1' and spacer disc 50' from the previous installation. This configuration is advantageous as it allows the mounting bracket to be replaced if breakage or fatigue of the mounting bracket occurs, or if a different type of mounting bracket is desired after the original installation. This is particularly advantageous as it allows for replacement or changing of mounting brackets without requiring additional penetrations through the roof surface and while allowing the sealing of the original roof penetrations to remain intact.

The embodiments of the present inventions should not be limited in scope by the embodiments described herein. Indeed, various modifications of the embodiments of the present inventions, in addition to those described herein, will be apparent to those of ordinary skill in the art from the foregoing description and accompanying drawings and claims. Thus, such modifications are intended to fall within the scope of this invention. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, this disclosure should be construed in view of the full breath and spirit of the embodiments disclosed herein and claimed below.

What is claimed is:

1. A photovoltaic mounting system comprising:
   a mechanical fastener;
   at least one photovoltaic mounting bracket including a flattened base portion adapted for mounting on a planar roof surface, an angled bent-up portion extending from the base portion to a flattened upper support portion adapted for supporting a photovoltaic module or photovoltaic coupling device, wherein the angled bent-up portion protrudes from away from the roof surface when the base portion is mounted on the roof surface;
   a sealant injection package engaged with the base portion, the sealant injection package comprising a collapsible sealant reservoir containing a flowable sealant therein and adapted for directionally controlled release of the flowable sealant upon collapse of the reservoir, wherein the sealant injection package is removable from the mounting bracket;
   and
   a compressing plate disposed above the collapsible sealant reservoir when the mounting bracket is mounted on the roof surface and having a through hole for passage of the mechanical fastener therethrough such that tightening of the fastener into the roof surface during mounting of the bracket to the roof surface moves the plate against the collapsible reservoir, thereby compressing the reservoir to effect directionally controlled release of the flowable sealant between the base portion and the roof surface and around the portion of the fastener penetrating the roof surface.

2. The photovoltaic mounting system of claim 1, wherein the compressing plate comprises:
   a head of the mechanical fastener, a washer, a nut, an upper plate of the sealant injection package, a cap or plate disposed atop the sealant injection package and separable therefrom, or any combination thereof.

3. The photovoltaic mounting system of claim 1, further comprising:
   a sealant guide for directing flow of the flowable sealant, delivered from the reservoir during collapse, to between the base portion and the roof surface and around a portion of the fastener extending through the roof surface.

4. The photovoltaic mounting system of claim 3, wherein the sealant guide comprises any of:
   a hole or slot defined in a bottom surface of the base portion of the bracket, or
   a shaped component disposed along a bottom of the sealant injection package.

5. The photovoltaic mounting system of claim 4, wherein the shaped component is any of:
   an integrated feature disposed along the bottom of the sealant injection package, or
   a separable component of the sealant injection package that releasably couples with each of the base portion of the bracket assembly.

6. A photovoltaic mounting system comprising:
   at least one photovoltaic mounting bracket including a lower base portion adapted for mounting on a roof surface and an upper support portion adapted for supporting a photovoltaic module or associated support component;
   a sealant injection package comprising a collapsible sealant reservoir containing a flowable sealant therein and adapted for directionally controlled release of the flowable sealant upon collapse of the reservoir, wherein the sealant injection package is removable from the mounting bracket,
   wherein the sealant injection package a includes a rigid or semi-rigid outer shell and a frangible portion in fluid communication with the interior of the sealant reservoir and through which the flowable sealant is released when the reservoir is collapsed, wherein the outer shell comprises a cylindrical shell with multiple tiers dimensioned to nest within one another so as to collapse the reservoir when the fastener is torqued into the roof;
   a mechanical fastener; and
   a compressing plate disposed adjacent the collapsible sealant reservoir and having a through hole for passage of the mechanical fastener therethrough such that tightening of the fastener into the roof surface during mounting of the bracket to the roof surface moves the plate against the collapsible reservoir, thereby compressing the reservoir to effect directionally controlled release of the flowable sealant between the base portion and the roof surface and around the portion of the fastener penetrating the roof surface.

7. The photovoltaic mounting of claim 6 further comprising:
a cylindrical cap disposed atop the sealant injection package and below a head or a nut of the fastener such that when the fastener is torqued against the roof, the cap covers the collapsed sealant injection package.

8. The photovoltaic mounting of claim 6 further comprising:
a sealant guide adapted to releasably couple with the base portion of the bracket along an upper side thereof and to releasably couple with a bottom side of the sealant injection package and to releasably couple with a bottom side of the sealant injection package, wherein the sealant guide defines a flow path that directs flow of sealant upon collapse of the reservoir between the base portion and the roof surface and around a portion of the fastener that penetrates the roof surface.

9. The photovoltaic mounting of claim 6 further comprising:
a planar spacer adapted for placement between the base portion of the bracket and the roof surface, the spacer having a through hole to allow passage of the lag bolt therethrough, wherein the spacer defines an enclosed space between the base portion of the bracket and the roof surface so as to contain flow of sealant within the space upon collapse of the sealant reservoir.

10. The photovoltaic mounting of claim 6 wherein the sealant injection package is adapted such that the collapsible cylindrical reservoir is cylindrical and surrounds a through passage extending longitudinally for passage of a lag bolt, wherein the sealant injection package further includes:
an outer cylindrical shell in which the sealant reservoir is disposed that comprises multiple tiers dimensioned so as to nest within one another when the cylindrical reservoir is collapsed, and
a disc disposed atop the cylindrical sealant reservoir so as to effect uniform collapse of the reservoir when the disc is compressed against the sealant reservoir by torqueing of a lag bolt extending through the passage into a roof surface.

11. The photovoltaic mounting of claim 6 wherein the sealant injection package comprises a cylindrical piston with a through-hole through which the fastener extends, the cylindrical piston including a rigid or semi-rigid out shell, a collapsible cylindrical reservoir therein, and a disc atop the cylindrical reservoir for engagement with the fastener for compressing the collapsible reservoir when the fastener is torqued down, and a frangible portion disposed at the bottom of the cylindrical reservoir to effect directionally controlled release of the sealant upon collapse of the reservoir through a sealant injection guide.

12. The photovoltaic mounting of claim 11, wherein the sealant injection guide includes a protruding ridge along the bottom of the sealant injection package that interfaces with a corresponding hole or slot in the base portion of the bracket.

13. A photovoltaic mounting system comprising:
at least one photovoltaic mounting bracket including a lower base portion adapted for mounting on a roof surface and an upper support portion adapted for supporting a photovoltaic module or associated support component, wherein the base portion is a rectangular extrusion having a lengthwise channel defined therethrough;
a sealant injection dispensing packaging comprising:
one or more collapsible sealant reservoir packets, each comprising a collapsible sealant reservoir containing a flowable sealant therein, wherein the sealant injection dispensing package is adapted for directionally controlled release of the flowable sealant upon collapse of the reservoir and is removable from the mounting bracket, and
a carrier for supporting the one or more sealant reservoir packets, wherein the carrier is slidable into the channel of the base portion to allow insertion, removal and/or replacement of the sealant reservoir packets;
a mechanical fastener; and
a compressing plate disposed adjacent the collapsible sealant reservoir and having a through hole for passage of the mechanical fastener therethrough such that tightening of the fastener into the roof surface during mounting of the bracket to the roof surface moves the plate against the collapsible reservoir, thereby compressing the reservoir of the one or more sealant reservoir packets to effect directionally controlled release of the flowable sealant between the base portion and the roof surface and around the portion of the fastener penetrating the roof surface.

14. The photovoltaic mounting of claim 13, wherein the base portion includes an underside channel defining a semi or fully enclosed space between the bottom surface of the base portion and the roof surface into which sealant flows when mounted.

15. A photovoltaic mounting system having a chemical flashing comprising:
a base portion;
a photovoltaic module mounting bracket including a flattened base portion adapted for mounting on a planar roof surface, an angled bent-up portion extending from the base portion to a flattened upper support portion coupled with at least one photovoltaic coupling device adapted for supporting a photovoltaic module, wherein the angled bent-up portion protrudes from away from the roof surface when the base portion is mounted on the roof surface;
a collapsible sealant reservoir positioned between the mounting bracket and the base portion and adapted for directionally controlled release of the flowable sealant upon collapse of the reservoir; and
a mechanical fastener extending through the base portion, wherein torqueing of the mechanical fastener to attach the base portion of the photovoltaic mounting system to a roof surface compresses the collapsible sealant reservoir causing directionally controlled release of sealant under the base portion around the fastener.

16. The photovoltaic mounting system of claim 15, wherein the collapsible sealant reservoir comprises a cylindrical shaped container having an axial passageway through which the fastener extends.

17. The photovoltaic mounting system of claim 16, wherein the cylindrical shaped container includes multiple tiers dimensioned to nest within one another so as to collapse the reservoir when the fastener is torqued into the roof surface.

18. A photovoltaic mounting system having a chemical flashing comprising:
a base portion;

a photovoltaic module mounting bracket including at least one photovoltaic coupling device;
a collapsible sealant reservoir positioned between the mounting bracket and the base portion; and
a mechanical fastener, wherein torqueing of the mechanical fastener to attach the photovoltaic mounting system to a roof surface compresses the collapsible sealant reservoir causing sealant to flow under the base portion around the fastener;
wherein the collapsible sealant reservoir comprises one or more collapsible packets, each packet comprising a collapsible shell defining a container with an open face and a frangible film or membrane sealed to the container across the open face so as to contain the sealant within the packet.

19. A photovoltaic mounting system comprising:
at least one photovoltaic mounting bracket including a flattened base portion adapted for mounting against a planar roof surface and having an opening for passage of a mechanical fastener, an angled bent-up portion extending from the base portion to a flattened upper support portion adapted for supporting a photovoltaic module or associated support component, wherein the angled bent-up portion protrudes from away from the roof surface when the base portion is mounted on the roof surface;
at least one reservoir of sealant mechanically coupled to the base portion of the at least one photovoltaic mounting bracket; and
a piston portion that is engaged when a mechanical fastener is torqued down through the base portion of the at least one photovoltaic mounting bracket thereby compressing the at least one reservoir and injecting the flowable sealant between the at least one mounting bracket and the roof surface and around the fastener.

20. The photovoltaic mounting system of claim 19, wherein the collapsible sealant reservoir comprises a cylindrical shaped container having an axial passageway through which the fastener extends and the piston portion comprises a disc disposed atop the cylindrical shaped container.

* * * * *